United States Patent [19]

Nonaka

[11] Patent Number: 4,855,585

[45] Date of Patent: Aug. 8, 1989

[54] DISTANCE MEASURING APPARATUS

[75] Inventor: Osamu Nonaka, Sagamihara, Japan

[73] Assignee: Olympus Optical Co., Ltd., Japan

[21] Appl. No.: 123,104

[22] Filed: Nov. 19, 1987

[30] Foreign Application Priority Data

Nov. 21, 1986 [JP] Japan .............................. 61-279243
Nov. 25, 1986 [JP] Japan .............................. 61-281530
Nov. 25, 1986 [JP] Japan .............................. 61-281531

[51] Int. Cl.4 .............................................. G01J 1/20
[52] U.S. Cl. .................................... 250/201; 354/403
[58] Field of Search ............... 250/201, 204, 208, 209; 356/1, 4; 354/403

[56] References Cited

U.S. PATENT DOCUMENTS 4,623,237  11/1986  Kaneda et al. ...................... 354/403
4,673,274  6/1987   Nagaoka et al. ................... 354/403
4,720,723  1/1988   Harunari et al. ................... 354/403
4,758,082  7/1988   Kozuki et al. ......................... 356/1

Primary Examiner—David C. Nelms
Attorney, Agent, or Firm—Louis Weinstein

[57] ABSTRACT

A distance measuring apparatus continuously projects pulses of infrared radiation toward a target, the distance to which is to be determined. Position of incidence of reflected radiation upon position detection means is represented by a pair of electrical signals, which are fed through switches to a common signal line. By operating the switches, one of the electrical signals is integrated in a positive direction while the other signal is integrated in a negative direction. A value of distance measued is derived in terms of the ratio of the number of integrating operations either in the positive or the negative direction with respect to the total number of integrating operations.

54 Claims, 20 Drawing Sheets

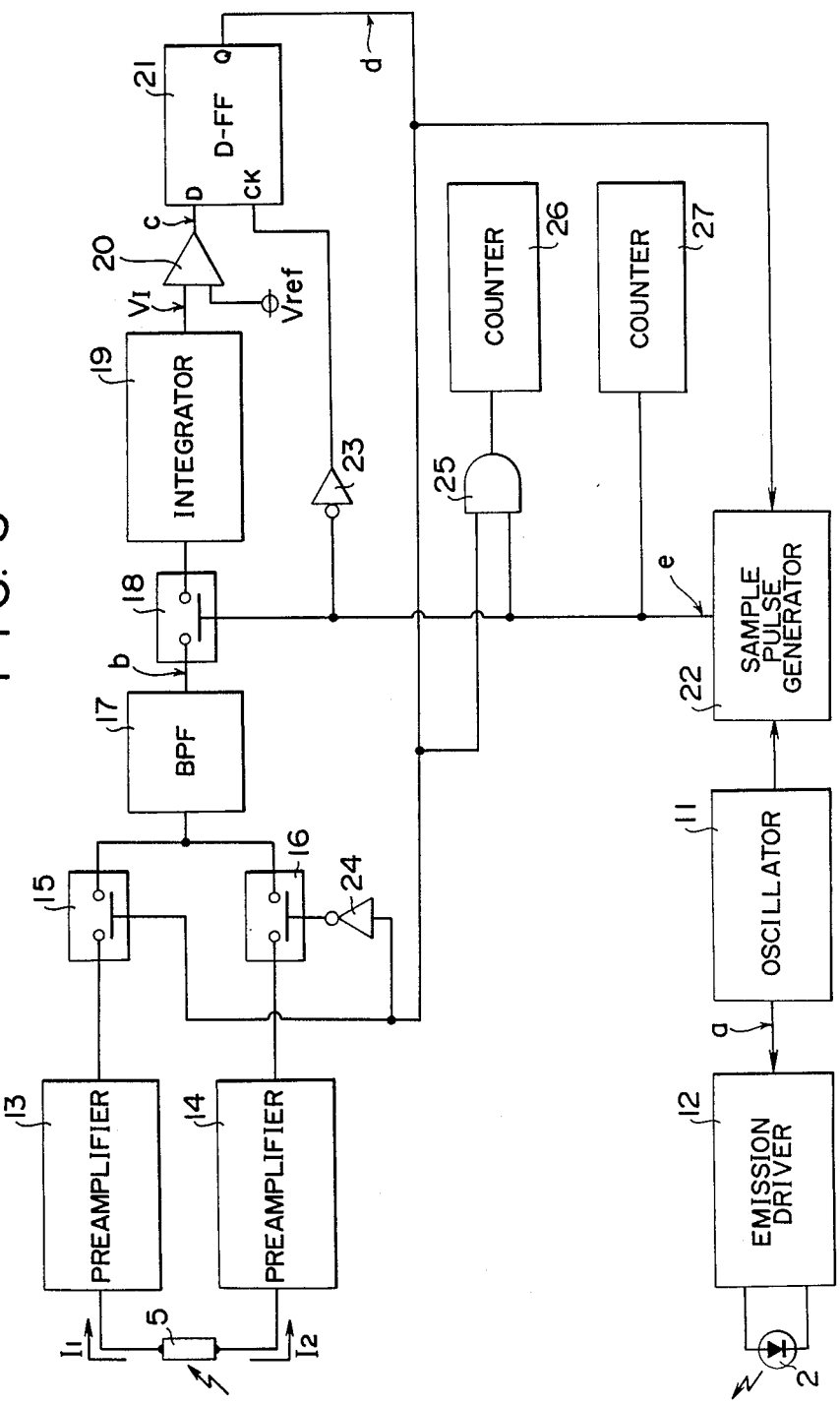
F I G. 3

DISTANCE MEASURING APPARATUS

FIELD OF INVENTION AND RELATED ART STATEMENT

The invention relates to a distance measuring apparatus, and more particularly, to such apparatus which projects a light beam directed to an object for determining a distance thereto in response to the reception of reflected light therefrom.

A distance may be determined by either an active technique in which either a light beam or an ultrasonic wave is projected for determining a distance on the basis of a reflected signal or by a passive technique which utilizes a trigonometry technique based on the brightness of an object being photographed or which utilizes the detection of the sharpness of the object. Either technique may be incorporated into a still camera or a video camera or the like. It is to be noted that the passive technique is ineffective in darkness and requires a massive arrangement, and thus is inferior to the active technique in terms of the costs required.

Many active techniques are available which project an infrared radiation directed to a target, the distance to which is to be determined. Reflected radiation impinges upon a lens, and the distance is determined in accordance with the location where the radiation impinges in the manner of the trigonometry. The position of incidence of reflected radiation is detected by using a position sensing detector (hereafter abbreviated as PSD) or a split sensor or light receiving element which is mechanically driven. However, while the projection of infrared radiation is relatively easy to implement, the accuracy decreases with increasing distance because of the signal-to-noise ratio of the reflected and the steady-state radiation.

It is possible to improve the accuracy with which the distance can be determined, by performing an integrating operation a number of times in synchronism with pulses of the infrared radiation in order to cancel out noise components. However, when the number of integrating operations increases in order to improve the accuracy, there results a correspondingly increased length of time interval which is required for determining the distance.

It is noted that the active technique of projecting infrared radiation which utilizes PSD dispenses with a control over the mechanical interlocking operation, but is limited in its application to small distances which provide a sufficient strength of reflected radiation because the distance is calculated on the basis of the ratio of two electrical signals.

On the other hand, a technique which controls a mechanical interlocking of a split sensor requires a mechanical scanning of a high precision, which is subject to a space requirement. However, it determines the distance by a mere comparison of two electrical signals, enabling the determination of a relatively far distance.

The choice of either sensor when a distance measuring apparatus is to be incorporated into a camera depends on the variety of the camera. However, since the electrical circuit of the distance measuring apparatus essentially comprises an integrated circuit, it is desirable for the purpose of a mass production that an implementation of a common arrangement except for the particular sensor be employed.

SUMMARY OF THE INVENTION

In view of the foregoing, it is an object of the invention to provide a distance measuring apparatus which eliminates a steady-state radiation and cancels noise components by periodically integrating signal components of a reflected radiation, thereby enabling the determination of a relatively increased distance.

It is another object of the invention to provide a distance measuring apparatus of the above character which determines a value of the distance through a number of integrating operations which depends on a desired accuracy.

It is a further object of the invention to provide a distance measuring apparatus of a high detection accuracy which permits either PSD or split sensor to be used.

In accordance with the invention, there is provided a distance measuring apparatus comprising radiation projecting means which is continuously driven to emit pulses of a radiation, reception means for providing a pair of electrical signals which correspond to the position of incidence of radiation reflected from an object being determined, switch means for switching between the pair of electrical signals to feed a common signal line, integrating means for integrating the pair of electrical signals fed to the common signal line in synchronism with the pulse from the projecting means, the integrating means integrating one of the electrical signals in a positive direction and integrating the other in a negative direction, comparison means for comparing an output from the integrating means against a reference signal, control means for controlling the switch means in accordance with a result of decision rendered by the comparison means so that an output from the integrating means shifts toward the reference signal, first counter means for counting the total number of integrating operations performed by the integrating means, and second counter means for counting the number of integrating operations which are performed by the integrating means in the positive or negative direction. A value of distance is determined on the basis of a count from the second counter means relative to a count from the first counter means. Accordingly, while employing the active technique which utilizes radiation projecting means, the signal-to-noise ratio is significantly improved while enabling a determination of a relatively increased distance with a high accuracy.

In accordance with the invention, there is also provided means for changing the total number of integrating operations in a variable manner depending on a photographing condition. A value of distance is determined on the basis of a count from the second counter means relative to a count from the first counter means when the given number of integrating operations, which depend on the photographing condition, is reached. In this manner, a determination of distance can be achieved either emphasizing the accuracy or the length of time required for the determination of the distance depending on the photographing condition.

In accordance with another aspect of the invention, there are also provided second comparison means which compares one-half the count from the first counter means against the count from the second counter means, and switch means for selecting either an output from the second comparison means or the count from the second counter means relative to the first counter means as a distance measuring output. When the radiation reception means utilizes a detector which provides a value of the distance when a coincidence is reached between the pair of electrical signals, namely, a split sensor, the switch means operates to select an output from the second comparison means as the distance measuring output. Alternatively, when the radiation reception means utilizes a detector which determines a value of distance on the basis of a ratio of the two electrical signals, or PSD, the switch means operates to select the count from the second counter means relative to the count from the first counter means as a distance measuring output. In this manner, the distance measuring apparatus of the invention may be used with either a PSD or a split sensor depending on a particular specification, and such versatility is advantageous in respect of mass production and contributes to a reduction in the cost.

BRIEF DESCRIPTION OF THE DRAWINGS

FIG. 3 is a block diagram of a distance measuring apparatus according to a first embodiment of the invention;

FIGS. 21A, 22B and 21C are schematic views of an optical system and a sensor, illustrating a scanning of the split sensor.

DETAILED DESCRIPTION OF PREFERRED EMBODIMENTS

Figure 1:
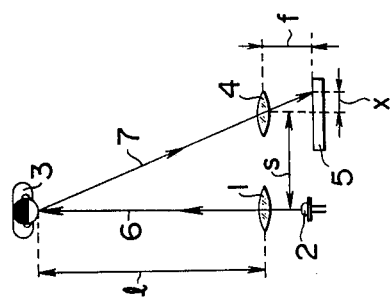

Before describing the apparatus of the invention specifically, the basic positional relationship between an optical system and a photoelectric transducer element in an active infrared radiation technique which is utilized in the apparatus of the invention will be described first with reference to FIG. 1.

A projection lens 1 is effective to project infrared radiation 6 from an infrared radiation emitting diode (hereafter abbreviated as IRED) 2, and radiation 7 reflected from an object 3 is imaged by a receiving lens 4 upon PSD 5. A distance l to the object 3 is calculated according to the following formula:

$$l = s \cdot f / x \quad (1)$$

where s represents the length of a baseline, f the focal length of the lens 4 and x a coordinate corresponding to the position of incidence of radiation upon PSD 5.

Figure 2:
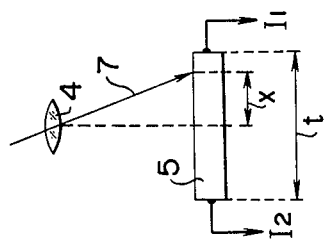
FIGS. 1 and 2 are schematic views illustrating a basic positional relationship between an optical system and a photoelectric transducer element in an active infrared radiation technique which is employed in an apparatus of the invention.

It will be understood that PSD 5 is formed by a semiconductor element as by PIN photodiode producing a photocurrent, responsive to the incident radiation, which is divided in accordance with a ratio which depends upon the position of incidence. The divided currents are delivered through terminals located at its opposite ends. As shown in FIG. 2, representing the total length of PSD 5 by t, when the center of the element is aligned with the optical axis of the lens 4, the photocurrent Ip which is developed upon incidence of the reflected radiation 7 upon PSD 5 will be divided at a ratio of $t/2 + x : t/2 - x$ as a result of the characteristic operation of the element. Accordingly, currents $I_1$ and $I_2$, which are delivered from the opposite terminals of the element, exhibit a ratio as defined below.

$$I_1/I_2 = (t/2+x)/(t/2-x) \quad (2)$$

Combining the equations (2) and (1), the ratio $I_1/I_2$ can be expressed as a function of the distance l alone.

$$I_1/I_2 = (lt - 2s \cdot f)/(lt - 2s \cdot f) \quad (3)$$

In this manner, the distance l can be calculated by obtaining the ratio $I_1/I_2$.

Figure 4:
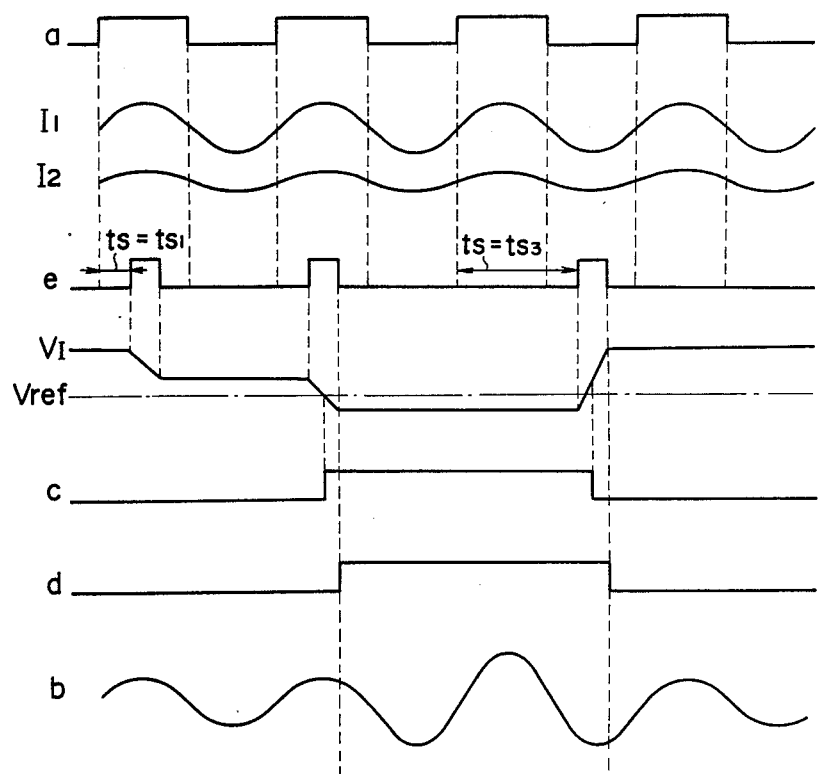
FIG. 4 is a series of timing charts illustrating the waveforms of various signals appearing in the apparatus shown in FIG. 3.

Referring to FIG. 3, there is shown an apparatus according to a first embodiment of the invention, which will be described with reference to a series of timing charts shown in FIG. 4. IRED 2 is driven for flashing operation in response to a pulse a having a frequency of 24 kHz and a duty cycle of 50% and produced by an oscillator 11, which is transmitted through an emission drive circuit 12. A pulse of infrared radiation which is emitted by IRED 2 is directed to the object, which then reflects it to impinge upon PSD 5. There occurs then a flow of currents $I_1$ and $I_2$ through the opposite terminals of PSD 5 with a ratio $(I_1/I_2)$ which depends on the distance l to the object. It will be apparent from the positional relationship between the optical system and PSD 5 as illustrated in FIGS. 1 and 2 that the currents $I_1$, $I_2$ are normally related to each other such that $I_1 \geqq I_2$. The currents $I_1$ and $I_2$ are fed to preamplifiers 13 and 14, respectively, each having a low input impedance, to be converted into corresponding voltages. Outputs from the preamplifiers 13 and 14 are fed to a bandpass filter (hereafter abbreviated as BPF) 17 through channel switches 15 and 16, respectively, each of which comprises an analog switch. It is to be noted that the channel switches 15 and 16 are selectively controlled so that one of them is turned on when the other is off. Accordingly, only one output from either amplifier 13 or 14 is fed to BPF 17.

An output from PSD 5 varies sinusoidally since IRED 2 is driven to emit a pulse, but BPF 17 operates to cut off a steady-state radiation to deliver only that signal component having a frequency equal to the oscillation frequency of the oscillator 11 as an output b for further amplification. The output b from BPF 17 is fed to an integrator 19 through a sample switch 18, which again comprises an analog switch. The sample switch 18 is controlled to be turned on by a sample pulse e from a sample pulse generator 22 which is driven in synchronism with the oscillator 11. Thus, each time a sample pulse e is generated, the integrator 19 is operative to integrate the output b from BPF 17 only during the time duration of the pulse.

An integrated output voltage $V_I$ from the integrator 19 is fed to one input of a comparator 20 so as to be compared against a reference voltage Vref. The comparator 20 delivers a high level (hereafter referred to as "H") signal when the output voltage $V_I$ is greater than the reference voltage Vref. Alternatively, it delivers a low level (hereafter referred to as "L") signal when the output voltage is less than the reference voltage. In either instance, an output c from the comparator is fed to a flipflop of D-type (hereafter abbreviated as D-FF) 21. D-FF 21 has a clock input CK, to which the output pulse e from the sample pulse generator 22 is applied after inversion through an inverter 23. An output d from D-FF 21 is used to control the turn-on or -off of the channel switches 15 and 16. Specifically, when the output d assumes its "H" level, the channel switch 15 is turned on while the channel switch 16 is turned off due to the presence of the inverter 24. Conversely, when the output d assumes its "L" level, the switches 15 and 16 are turned off and on, respectively. In this manner, the output b from BPF 17 is switched between a passband component contained in the current $I_1$ and a passband component contained in the current $I_2$ in response to the output d from D-FF 21. It will be noted that D-FF 21 also controls the timing when the generator 22 is to generate a sample pulse.

Specifically, when the output d from D-FF 21 assumes its "L" level, the sample pulse e is developed at the center of the "H" level of the pulse e or at a point in time when the currents $I_1$ and $I_2$ exhibit their maximum level upon receiving reflected infrared radiation, by choosing $t_{s1}$ as a delay time $t_s$ from the rising edge of the pulse a. When the output d assumes its "H" level, the sample pulse e is developed at the center of the "L" level of the pulse a or when the currents $I_1$ and $I_2$ assume their minimum level upon receiving reflected infrared radiation, by choosing $t_{s3}$ as the delay time $t_s$ from the rising edge of the pulse a. In this manner, the sample pulse e is effective to turn the sample switch 18 on in synchronism with the peak value or thereabout of the output b from BPF 17, thus causing a synchronized integrating operation of the integrator 19. 20 The output d from D-FF 21 and the output pulse e from the sample pulse generator 22 are fed through AND gate 25 to a counter 26 while the output pulse e from the generator 22 is fed alone to a counter 27. It will be understood that the counter 27 is effective to count the total number of sample pulses e generated by the sample pulse generator 22, or the total number of integrating operations performed by the integrator 19 as the sample switch 18 is successively turned on. By contrast, the counter 26 is effective to count a fraction of the total number of integrating operations performed by the integrator 19 which corresponds to those integrating operations which take place when the output d from D-FF 21 assumes its "H" level, or the number of integrating operations for a signal voltage corresponding to the current $I_1$ when the channel switch 15 is turned on.

In this manner, signals which are based on the output currents $I_1$ and $I_2$ from PSD 5 are integrated in one direction and in an opposite direction for comparison against the reference voltage Vref. An integration in the opposite direction usually takes place by inverting the signal. However, in the present instance, such integration is implemented by displacing the timing of the integrating operation by one-half the period T, utilizing the fact that the output b from BPF 17 is sinusoidal, in order to simplify the analog circuit. It will be understood that D-FF 21 functions to prevent a switching operation during an integrating operation. By repeating the synchronous integrating operation a number of times, it will be seen that the ratio of the currents $I_1$ and $I_2$ is determined in terms of the ratio of the total number of integrating operations and the number of integrating operations in the opposite direction. In the present embodiment, the counter 27 which counts the total number of integrating operations and the counter 26 which counts the number of integrating operations which take place in the positive direction are utilized to provide a digital value for the ratio of the currents $I_1$ and $I_2$, thereby deriving the distance l to the object.

It is to be noted that the described process of determining the distance on the basis of the number of integrating operations avoids the need to obtain the magnitude of the currents $I_1$ and $I_2$ directly, thus cancelling noise to reduce its adverse influence upon the detection of a very small current and allowing the signal-to-noise ratio to be enhanced in a relative manner.

It is also to be noted that repeating the integrating operation in the positive and the negative direction eliminates the need for a consideration of an influence of a saturation which may be caused by a limited supply voltage or the like, thus allowing the gain of the respective preamplifiers 13 and 14 to be increased. This reduces the influence upon the switches 15, 16 and 18 of spike noises which are inherently associated with analog switches, thus enabling the accuracy of decision rendered by the comparator 20 to be enhanced. In addition, an integrated voltage can be maintained substantially constant, which allows a simple compensation of dielectric loss or leakage current associated with an integrating capacitor, not shown, which is used as part of the integrator 19.

Figure 5:
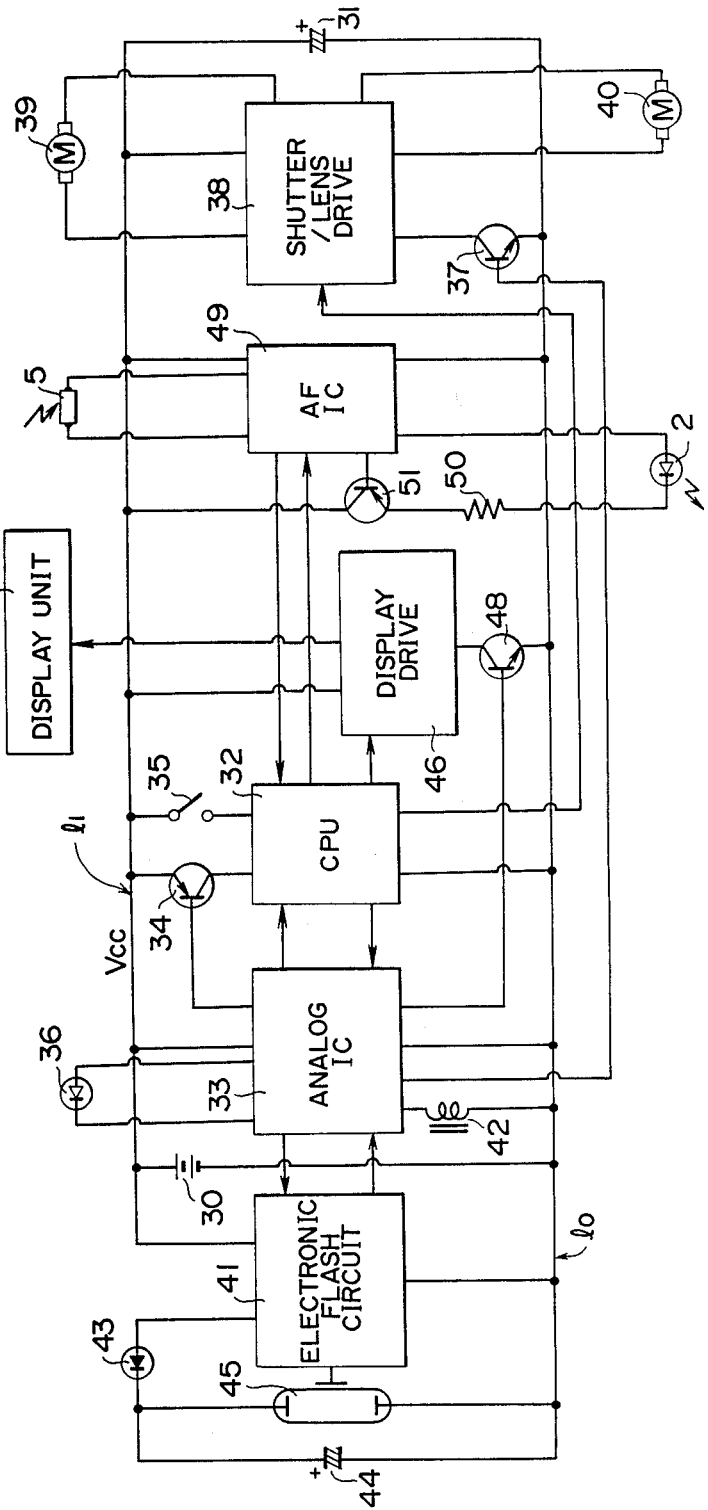
FIG. 5 is a block diagram of a full-automatic camera which incorporates the distance measuring apparatus shown in FIG. 3.

A full-automatic camera incorporating the distance measuring apparatus according to the first embodiment will now be specifically described. FIG. 5 is a block diagram of an entire circuit arrangement of the full-automatic camera. A power supply is connected across a pair of buses $l_1$, $l_0$ across which a capacitor 31 is also connected to maintain a supply voltage Vcc constant. CPU 32 comprising a one-chip microcomputer is used to control a sequence of operations which takes place within the entire camera. However, it is to be noted that CPU 32 fails to exercise its proper functioning if the voltage Vcc from the supply 30 is reduced. It also lacks a function to monitor the supply voltage Vcc, and accordingly, the power supply system for CPU 32 is controlled by an analog IC (integrated circuit) 33 formed by analog elements. Specifically, the analog IC 33 monitors the supply voltage Vcc, and whenever the voltage exceeds a given value, it turns a power control transistor 34 which is connected to CPU 32 on while it turns the transistor 34 off when the supply voltage reduces below the given value, thus controlling the power supply to CPU 32. A release switch 35 is connected to CPU 32.

In addition to its function to monitor the supply voltage Vcc, the analog IC 33 also has a power-on/reset function, which resumes the operation by applying a reset signal to CPU 32 after the supply voltage Vcc has recovered satisfactorily, and a battery check function. Additionally, the analog IC 33 includes an A/D conversion circuit which converts an output from photodiode 36 into a digital signal for deriving brightness information for the purpose of exposure control; a constant current circuit which drives a film feed motor 39 and a shutter control and lens motor 40 with a constant current through a shutter/lens drive circuit 38 by turning a transistor 37 on; an interface circuit which transmits an instruction from CPU 32 to an electronic flash circuit 41; and a drive circuit for a shutter driving combination electromagnet 42. It is to be noted that the angle of rotation of the motor 40 can be detected by a combination of a pattern chart, which rotates in synchronism with the motor, and a photo-reflector.

In response to a signal from the analog circuit 33, the electronic flash circuit 41 operates to charge 20 a main capacitor 44 through a rectifier 43 to achieve a booster operation, and subsequently triggers a flash discharge tube 45 for emission of light or radiation. Upon completion of a charging operation for the main capacitor 44, the flash circuit 41 delivers a charging complete signal, which is transmitted through the analog circuit 33 to CPU 32.

A display drive circuit 46 is commanded by CPU 32 to display an operating status of the camera or a warning to a user on a display unit 47 which comprises a liquid crystal element. The display drive circuit 46 is also subject to the likelihood that a wrong display may be delivered if the supply voltage Vcc is reduced. Accordingly, its power supply is also controlled by turning a transistor 48 on in response to a signal from the analog circuit 33.

An automatic focus IC (hereafter abbreviated as AFIC) 49 responds to an automatic focus (AF) operation initiate signal from CPU 32 by performing an AF sequence, which is actually achieved by logic circuits contained therein. The operation of the sequence is synchronized with a fundamental clock which is developed by CPU 32. It will be seen that the distance measuring apparatus of the invention is contained within AFIC 49. The logic circuit within AFIC 49 comprises the oscillator 11, D-FF 21, the sample pulse generator 22, the inverters 23, 24, AND gate 25, and counters 26, 27, all of which have been illustrated in FIG. 3. It also comprises an additional circuit which is formed by an analog circuit. A transistor 51 is connected between bus $l_1$ and IRED 2 through a series resistor 50 for activating the emission.

Figure 6:
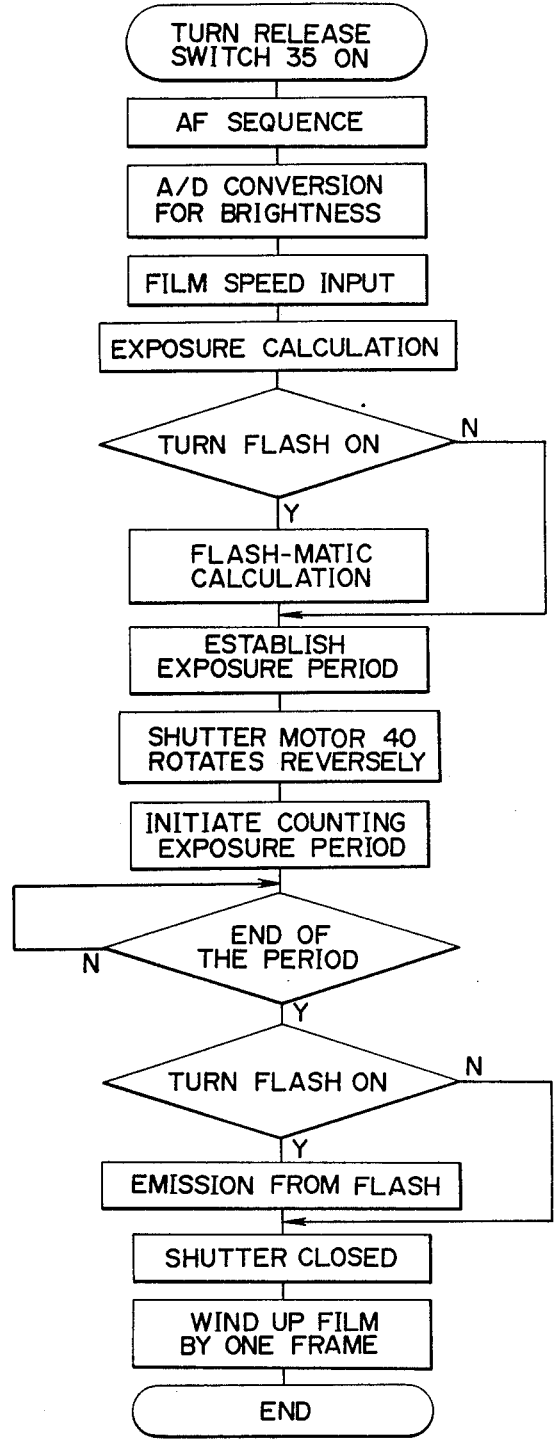
FIG. 6 is a flowchart illustrating a sequence of operations by the full-automatic camera shown in FIG. 5.

FIG. 6 is a flowchart which illustrates the sequence of operations performed within the full-automatic camera. It is assumed that the angle of rotation of the shutter control and lens motor 40 in the forward direction determines a forward movement of a focussing lens in a unique manner and that the camera employs a programmed lens shutter having an opening diameter which varies with the time duration during which the motor rotates in the reverse direction.

Initially when the release switch 35 is turned on, an AF sequence takes place in a manner to be described later. Subsequently, data representing brightness of an object being photographed is subject to an A/D conversion and data representing film speed is entered to enable an exposure calculation. Specifically, CPU 32 calculates an exposure period of the shutter in a digital manner based upon various digital input data which are supplied to CPU 32. When the brightness level is low, the exposure period will increase in length, giving rise to the likelihood that a manual shaking of the camera may result. Accordingly, in such instance, an exposure period which provides a proper diaphragm aperture is calculated by performing a flash-matic process on the basis of a guide number of internally housed electronic flash, AF information and film speed. After the exposure period has been determined, the motor 40 rotates in the reverse direction for a given time interval to establish an opening diameter of the lens shutter, and a counting of the exposure period is initiated when such opening diameter has been established. The shutter is closed upon completing the counting of the established exposure period. However, in the event the flash-matic calculation process is employed, the electronic flash will be activated for emission immediately before the shutter becomes closed. After the closure of the shutter, the film is wound up by one frame by the motor 39 to complete a sequence of operations.

Figure 7:
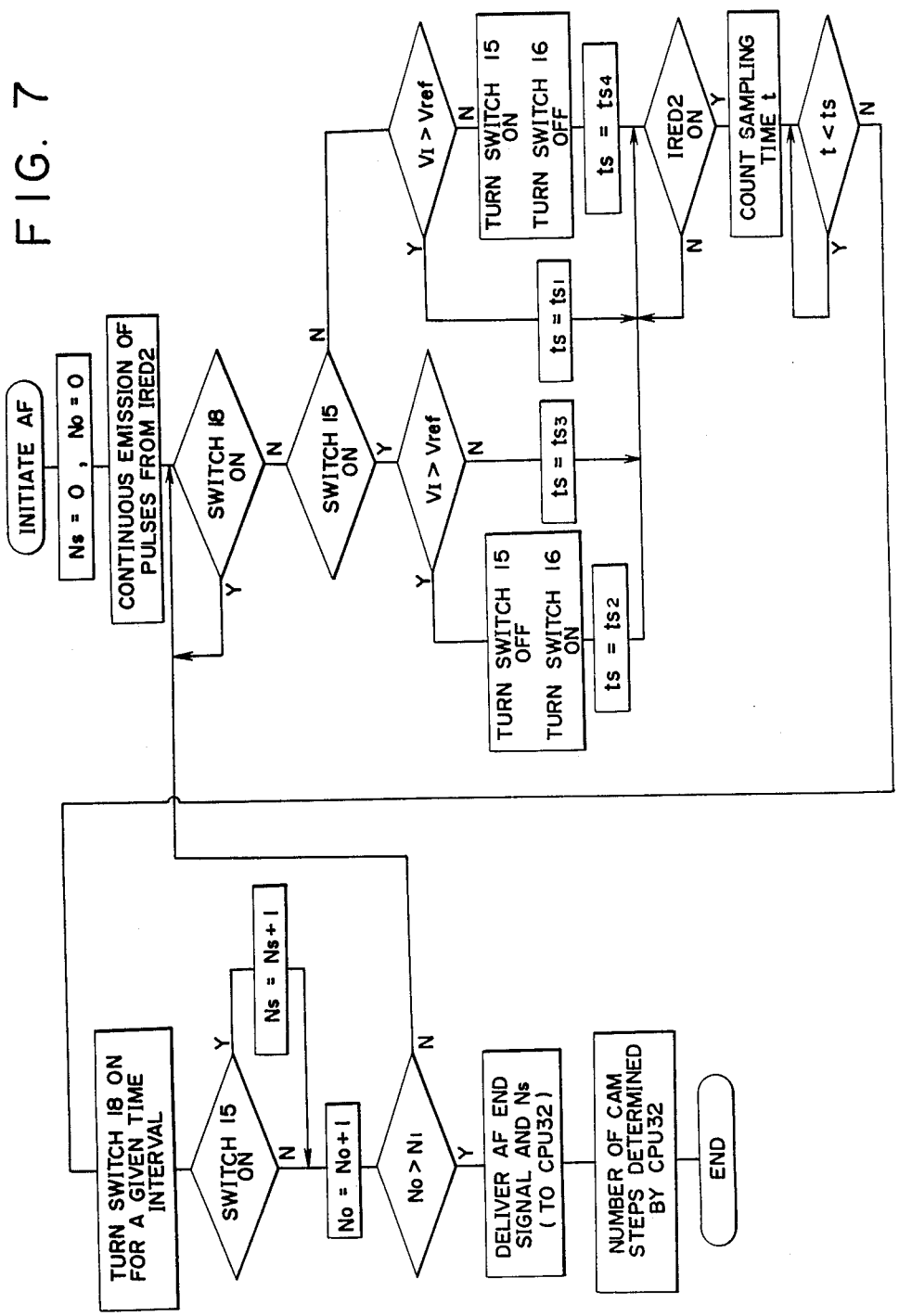
FIG. 7 is a flowchart of an AF sequence appearing in the flowchart shown in FIG. 6.

FIG. 7 is a flowchart illustrating the AF sequence, the operation of which will now be described with reference to the block diagram of FIG. 3 and the series of timing charts of FIG. 4 which illustrate the operation.

The operation of the AF sequence is initiated when AFIC 49 receives the AF initiate signal and the basic clock from CPU 32. The contents in the counters 26 and 27, namely, the number of integrating operations $N_S$ and the number of total integrating operations (the number of detections) $N_0$ are both reset to 0. Representing the number of integrating operations which take place in the negative direction by $N_G$, the following relationship applies:

$$N_0 = N_S + N_G \qquad (4)$$

When the number of integrating operations $N_S$ is normalized by fixing the total number of integrating operations $N_0$ to $N_1$, the distance l to the object being photographed can be determined in terms of the number $N_s$. Assume that $N_1 = 400$. Since the accuracy of the AF operation can be varied with an increase or decrease in the total number of integrating operations, a logic circuit which can be changed in accordance with the software contained within CPU 32 is employed in order to enhance the versatility of AFIC 49. When it is desired to determine the distance l, the number of integrating operations $N_S$ is given as follows:

$$N_S = \frac{I_2}{I_1 + I_2} N_1 \quad (5)$$

Substitution of the equation (3) into the equation (5) yields:

$$N_S = \left(\frac{1}{2} - \frac{sf}{lt}\right) N_1 \quad (6)$$

When the operation of the AF sequence is initiated, IRED 2 begins to emit pulses at a frequency of 24 kHz and with a duty cycle of 50%. The drive current used is 250 mA. The emission of pulses is continued until the operation of the AF sequence is completed.

After starting the emission of radiation from IRED 2, the on or off condition of the channel switch 15 is determined while the sample switch 18 remains off, and the integrated voltage $V_I$ is compared against the reference voltage Vref. As mentioned previously, the channel switches 15 and 16 are changed as a result of comparison of the integrated voltage $V_I$ against the reference voltage Vref. In order to avoid an error which may be caused by a switching operation which occurs in the course of an integrating operation, such switching is inhibited during the time the sample switch 18 remains on. This function is served by D-FF 21 in the embodiment shown in FIG. 3 (see FIGS. 3 and 4).

It will be noted that the channel switch 15 transmits an amplified output resulting from the current $I_1$ while the switch 16 transmits an amplified output resulting from the current $I_2$. The direction in which an integrating operation takes place is switched in a digital manner in response to a change in the turn-on timing of the sample switch 18 since the output b from BPF 17 is sinusoidal. Specifically, the integrating operation in the positive or the negative direction is switched depending on whether a sampling takes place at a positive peak or a negative peak of the sinusoidal wave. The timing to the sampling point is referenced to the rising edge of the pulse which is used to drive IRED 2. It will be apparent from FIG. 4 that the positive or the negative direction in which the integrating operation takes place depends on the timing of the sample pulse. In actuality, there is a time lag between the drive waveform applied to IRED 2 and an output waveform from BPF 17 due to an influence of the filter, but is neglected in the timing charts of FIG. 4 in order to simplify the illustration.

Assuming that the channel switch 15 is off or the channel switch 16 is on, an output from the comparator 20 is examined, and if $V_I > V_{ref}$, the timing $t_s$ when the sample pulse e occurs is chosen to be equal to $t_{s1}$. After establishing the timing $t_s$ for the occurrence of the sample pulse e, the sampling time t is counted after IRED 2 is turned on until the timing $t_s$ is reached. Thereupon, the sample switch 18 is turned on for a given time interval, and the on or off condition of the channel switch 15 is examined. If the switch 15 is off, this means that the integrating operation takes place in the negative direction during the on duration of the sample switch 18, and accordingly, the number of integrating operations $N_S$ is not counted while incrementing only the total number of integrating operations $N_0$ by one. Since $N_0 < N_1$ (=400), the program returns to the point where the on or off condition of the sample switch 18 is determined. This operation is subsequently repeated.

When the integrating operation in the negative direction results in $V_I < V_{ref}$, the channel switch 15 is turned on while the switch 16 is turned off, thus changing the direction in which the integrating operation occurs.

Since the channel switch 15 is on while the integrating operation takes place, the timing for the occurrence of the sample pulse e is then chosen to be $t_s = t_{s3}$ if $V_I < V_{ref}$. When the integrating operation takes place, the number $N_S$ is incremented by one, and then the total number $N_0$ is also incremented by one. Unless the total number $N_0$ reaches $N_1$, the program returns to the point where the on or off condition of the sample switch 18 is determined. When the integrating operation results in $V_I > V_{ref}$, the channel switch 15 is again turned off while the channel switch 16 is turned on, thus changing the direction in which the integrating operation takes place.

With the circuit arrangement as shown in FIG. 3, the superposition of an A.C. waveform which occurs as the channel switches 15 and 16 are changed results in a distortion in an output from BPF 17. Accordingly, it is desirable to choose a longer value for the timing $t_s$ for the occurrence of the sample pulse e which is developed immediately after the switching operation in order to allow the output from BPF 17 to be stabilized. In the flowchart shown in FIG. 7, the timing $t_s$ for the occurrence of the sample pulse e is not changed from $t_{s1}$ to $t_{s3}$ or from $t_{s3}$ to $t_{s1}$ immediately, but immediately after the switching operation, a longer interval $t_{s4}$ and $t_{s2}$ which are greater than $t_{s3}$ and $t_{s1}$, respectively, are chosen so that the timing changes in the manner of $t_{s1} \rightarrow t_{s4} \rightarrow t_{s3}$ or $t_{s3} \rightarrow t_{s2} \rightarrow t_{s1}$. Specifically, no sample pulse is developed for three periods which follow the switching operation. Since one period T is equal to 41.7 $\mu$ sec, it follows that if $t_{s1} = 7$ $\mu$ sec and $t_{s3} = t_{s1} + 20.8$ $\mu$ sec, $$t_{s2} = t_{s1} + 125.1 \ \mu \text{ sec}$$

$$t_{s4} = t_{s3} + 125.1 \ \mu \text{ sec}$$

It is to be noted that the width of the sample pulse or the on duration of the sample switch 18 is equal to 7 $\mu$ sec.

The described operation is repeated until the total number of sample pulses e, $N_0$, is equal to the value $N_1$ which is output from CPU 32. The number of integrating operations $N_S$ which take place in the positive direction is delivered to CPU 32. Thus, when the total number $N_0$ given by the counter 27 becomes equal to 400, an AF end signal and the number of integrating operations $N_s$ given by the counter 26 are transferred to CPU 32 as serial data. It is to be understood that the function of the counters 26 and 27 may be contained within CPU 32. In such instance, the sample pulses for the integrating operation in the positive and the negative direction are directly input to CPU 32.

CPU 32 then calculates the distance l to the object being photographed in accordance with the equation (6), and determines the number of cam steps required of the focussing lens. Obviously, this could be accomplished by a simple digital comparator. In such instance, a number of cam steps is determined by a sequential comparison against information which are previously stored in a memory rather than by using a calculation, thus dispensing with a complex calculation. A series of operations in the AF sequence is completed when the number of cam steps of focussing lens, and hence an angle of rotation in the forward direction of the shutter control and lens motor 40, is determined.

Figure 8:
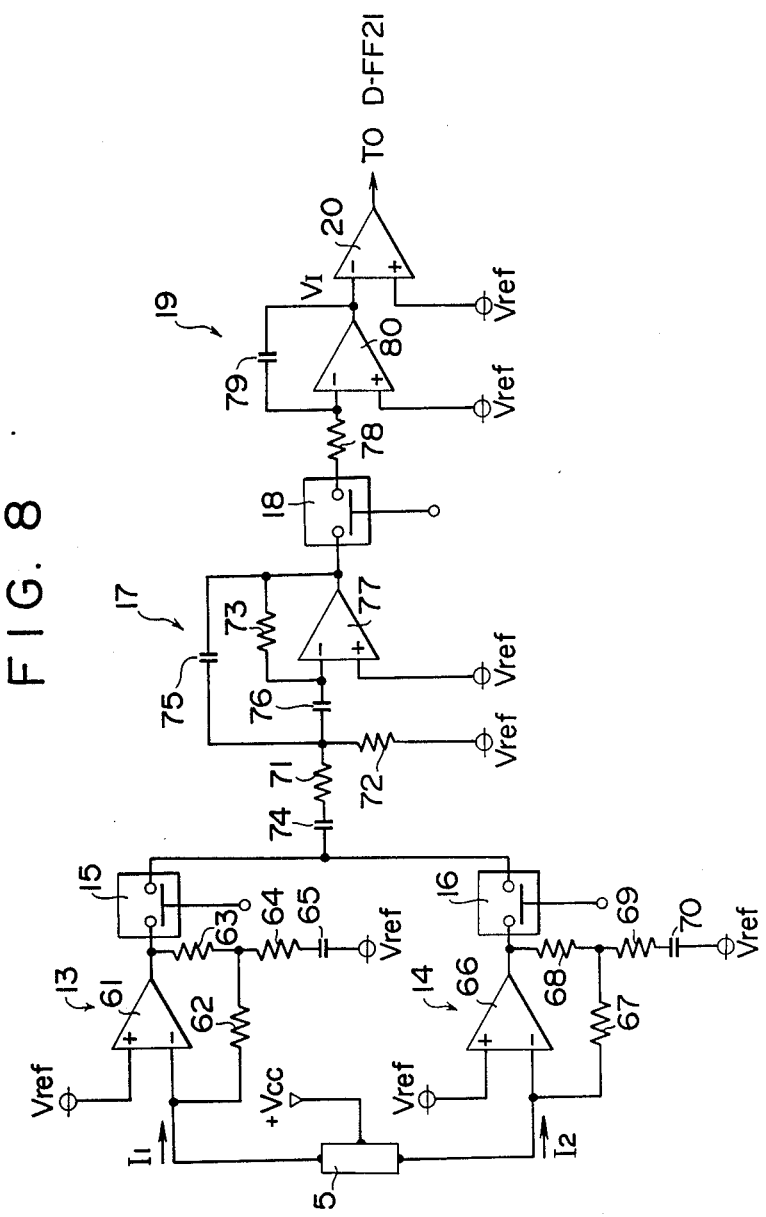
FIG. 8 is a circuit diagram of a specific example of an analog circuit used in the distance measuring apparatus shown in FIG. 3.

FIG. 8 shows a specific example of an analog circuit used in the circuit arrangement of the distance measuring apparatus shown in FIG. 3. The preamplifier 13 comprises an operational amplifier 61, resistors 62 to 64 and capacitor 65 for amplifying an output current $I_1$ from PSD 5. Similarly, the preamplifier 14 which amplifies current $I_2$ comprises an operational amplifier 66, resistors 67 to 69 and capacitor 70. BPF 17 comprises resistors 71 to 73 and capacitors 74 to 76 as well as an operational amplifier 77. The integrator 19 comprises a resistor 78, capacitor 79 and an operational amplifier 80. An output from D-FF 21 is directly applied to the control terminal of the channel switch 15 while an inverted output from D-FF 21 is applied to the control terminal of the channel switch 16. An output from the sample pulse generator 22 is applied to the control terminal of the sample switch 18, as will be apparent from FIG. 3. The reference voltage Vref is applied to each non-inverting input terminal of operational amplifiers 61, 66, 77 and 80 as well as the non-inverting input terminal of comparator 20. In the integrator 19, if the level applied to the inverting input terminal of the amplifier 80 is greater than the reference voltage Vref, an integrating operation takes place in a direction to charge the capacitor 79 such that its input side is positive. Conversely, when such level is less than the reference voltage Vref, the integrating operation takes place in a direction to charge the input side of the capacitor 79 to the negative polarity.

By experiments, it is found that the distance measuring apparatus of the embodiment described enables a distance to be determined, which is as long as about one and one-half times that which can be determined in the conventional so-called one-shot technique utilizing a single pulse of infrared radiation emitted, assuming that the same optical system is used. It will be evident that the accuracy of determining the distance can be improved by increasing the total number of integrating operations.

Figure 9:
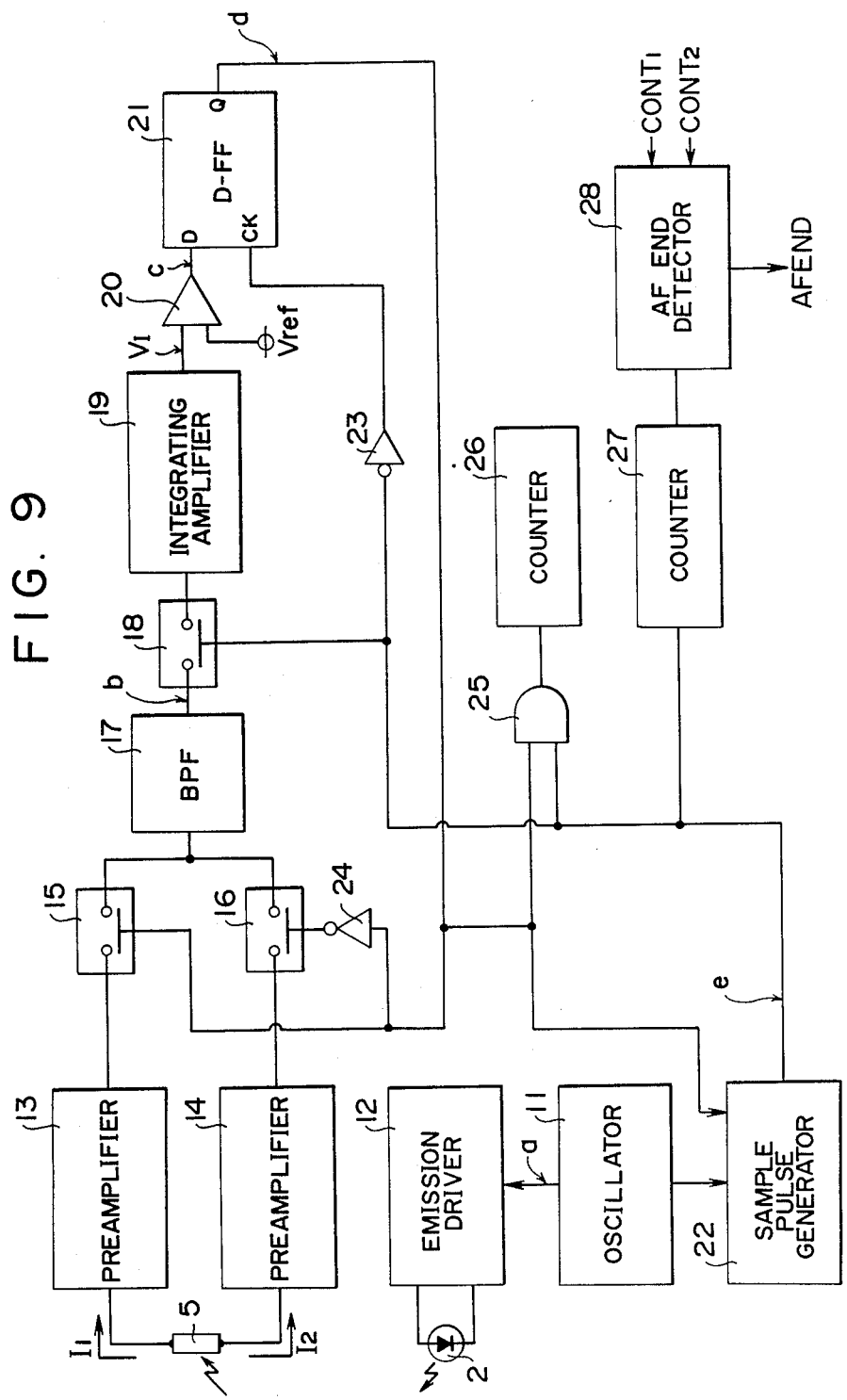
FIG. 9 is a block diagram of a distance measuring apparatus according to a second embodiment of the invention.

FIG. 9 shows a distance measuring apparatus according to a second embodiment of the invention which operates based on the same principle as the first embodiment, but in which determination of the distance is achieved with an optimum accuracy and is terminated within a given time interval which depends on a photographing condition. At this end, an automatic focussing (AF) end detector circuit 28 is added. In other respects, the arrangement remains the same as before, and accordingly corresponding parts are designated by like reference numerals in FIG. 9 as before. Only the difference will be described below.

The oscillator 11 produces a pulse a of a frequency 20 kHz and having a duty cycle 50%, which is applied through the emission drive circuit 12 to IRED 2 for causing a flashing operation thereof. The counter 27 which counts the total number of integrating operations performed by the integrator 19 is formed by a presettable down-counter in this instance, and when the total number of integrating operations reaches a given value, the AF end detector circuit 28 delivers an AF end signal AFEND.

It will be apparent that with the distance measuring apparatus of the invention, the distance can be determined to a higher accuracy by increasing the total number of integrating operations. However, an undue increase in this number requires a prolonged length of time for the determination of the distance, which is impractical.

Accordingly, in the distance measuring apparatus shown in FIG. 9, a photographing operation is enabled with an optimum accuracy which depends upon a particular photographing condition, taking either one or both of a focal length of a taking lens and a diaphragm information during the photographing operation. Specifically, a signal $CONT_1$ which changes between "1" and "0" depending on the focal length f of the taking lens and another signal $CONT_2$ which again changes between "1" and "0" depending on diaphragm data F No are supplied to the end detector circuit 28. In response to the application of the signals $CONT_1$ and $CONT_2$ supplied to the AF end detector circuit 28, a given count to which the counter 27 counts to deliver the AF end signal AFEND, or the total number of detections, is changed. As mentioned previously, the total number of detections represents a number of detections which are used to complete a single measurement, and is equivalent to the total number of integrating operations. In this manner, the determination of distance can be accomplished with an accuracy which depends on a photographing condition without unduly increasing the number of detections.

Figure 10:
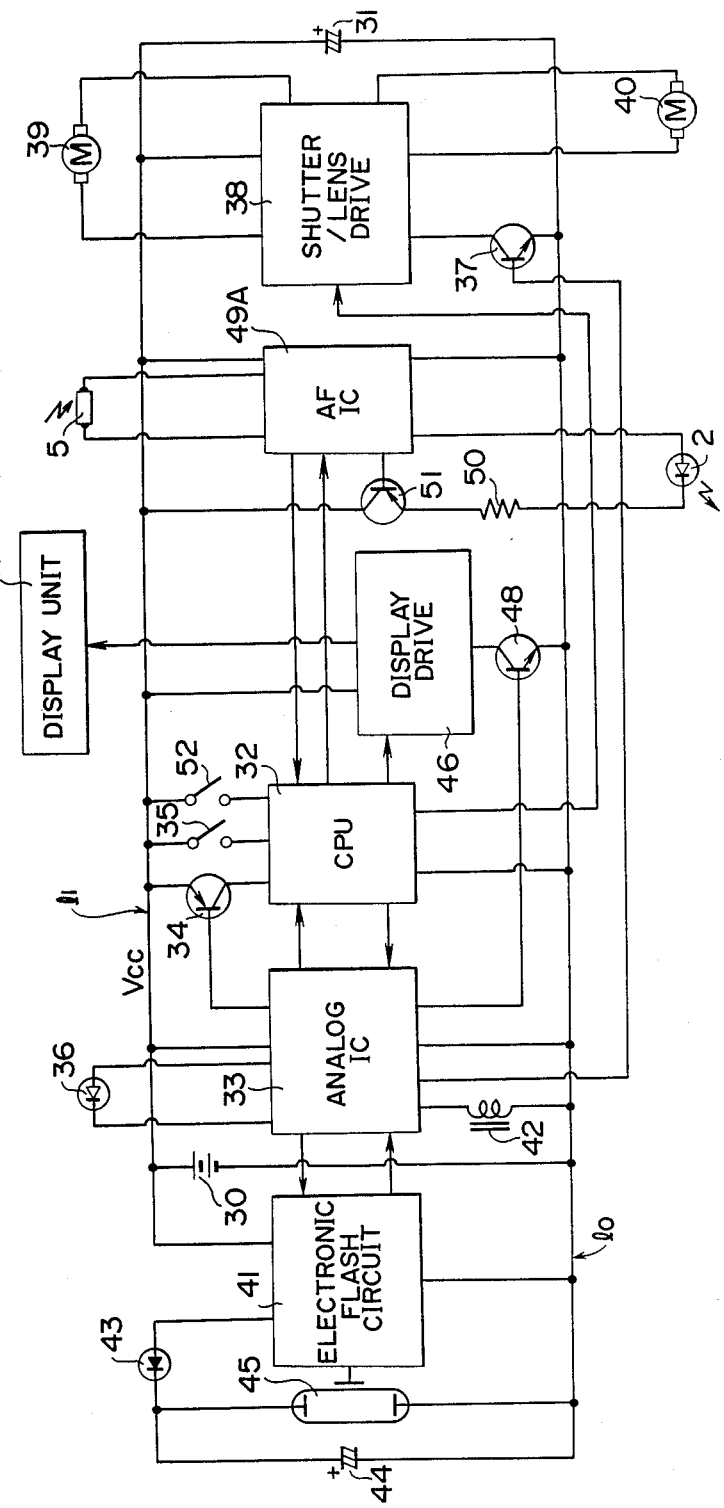
FIG. 10 is a block diagram of a full-automatic camera incorporating the distance measuring apparatus shown in FIG. 9.

A full-automatic camera which incorporates the apparatus of the second embodiment will now be described. FIG. 10 shows an electrical circuit of the camera. The camera is generally similar to the first mentioned camera except that CPU 32 incorporates a lens changeover switch 52 which is switched in response to a change in the focal length f of the taking lens and that AFIC 49A is formed with the distance measuring apparatus of the second embodiment, and in other respects, the arrangement is completely the same. Accordingly, corresponding parts are designated by like reference numerals or characters and will not be specifically described again.

It is to be understood that for a compact camera, the switch 52 is operated to establish a preset value for the focal length f. Thus, with a camera employing an interchangeable lens, information representing the focal length may be supplied from lens ROM to CPU 32.

Figure 11:
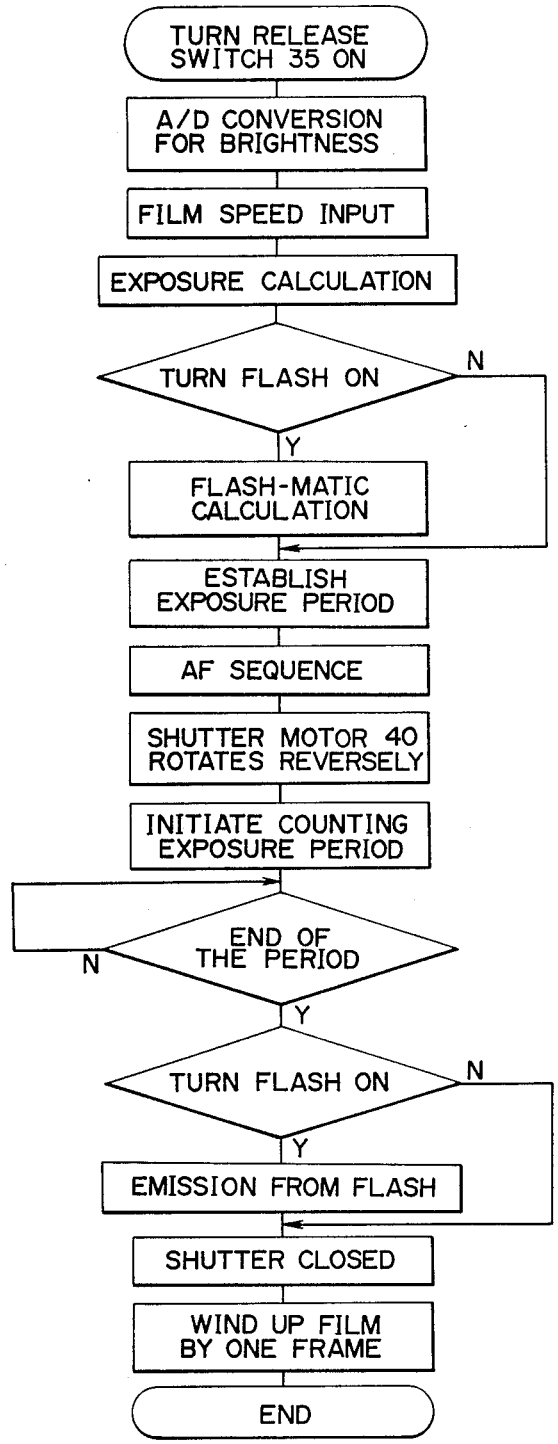
FIG. 11 is a flowchart illustrating a sequence of operations performed by the full-automatic camera shown in FIG. 10.

FIG. 11 shows a flowchart which illustrates the sequential operation of the full-automatic camera. It is assumed as before that a forward movement of the focussing lens is uniquely determined by an angle of rotation of the shutter control and lens motor 40 in the forward direction and that a programmed lens shutter having an opening diameter which varies with the time duration of the rotation in the reverse direction is employed.

Initially, when the release switch 35 is turned on, CPU 32 recognizes this fact and enters information representing the brightness of an object being photographed. This information is obtained by a conversion of an output from the photodiode 36 in an A/D conversion circuit contained within the analog IC 33. Digital input data representing a film speed is also entered. In the exposure calculation, CPU 32 calculates a combination of a diaphragm aperture and an exposure period which would provide a proper exposure, on the basis of such digital information entered. Under a low brightness, a flash-matic calculation utilizing a guide number of an internally housed electronic strobo unit, AF information and film speed information is performed, deriving an exposure period which would provide a proper diaphragm aperture.

Utilizing the on or off condition of the switch 52 which determines a difference in the diaphragm aperture or the focal length f of the taking lens thus established, CPU 32 establishes a required accuracy with which the determination of the distance is to be performed, which is then preset into AFIC 49A. The operation of the AF sequence then takes place as will be described later.

Upon completion of the AF sequence, the motor 40 rotates in the reverse direction to establish an opening diameter of the lens shutter which corresponds to a predetermined exposure period, and a counting of the exposure period is initiated with this opening diameter. When the counting operation terminates, the shutter is closed. However, when the flash-matic calculation is performed, the electronic flash unit is activated immediately before the shutter is closed. After closure of the shutter, the motor 39 winds up the film by one frame, thereby completing a series of sequential operations of the intended photographing operation.

The switching of the accuracy with which the distance is determined will now be described. Table 1 below illustrates several examples of the total number of detections which are employed in the distance measuring apparatus of the present embodiment.

TABLE 1

| f | F-number | |
|---|---|---|
| | 5.6 or greater | less than 5.6 |
| less than 50 mm | 128 | 256 |
| 50 mm or greater | 256 | 512 |

When the F No increases, the depth of field of view increases, and a relatively low level of accuracy may be used in determining the distance without causing any difficulty in the photographing operation. The same applies when the focal length f of the taking lens reduces, which also increases the depth of field of view. Consequently, the depth of field of view may be expressed as follows, utilizing F No and f:

The depth of front field of view $\approx$

The depth of rear field of view $\propto$ F No/$f^2$

In Table 1, it will be seen that numbers 128, 256 and 512 indicate the total number of detections. This is premised on the theory that if noise occurs randomly, the greater the number of detections, the greater the cancelling effect upon noise, thereby yielding a favorable sensitivity. Specific values for the total number of detections have been chosen so as to facilitate an implementation with a binary counter, based on experimental results. CPU 32 establishes the total number of detections in accordance with Table 1 in response to the entry of the focal length f supplied through the lens changeover switch 52, film speed information, diaphragm information F No which is calculated on the basis of brightness information.

Figure 12:
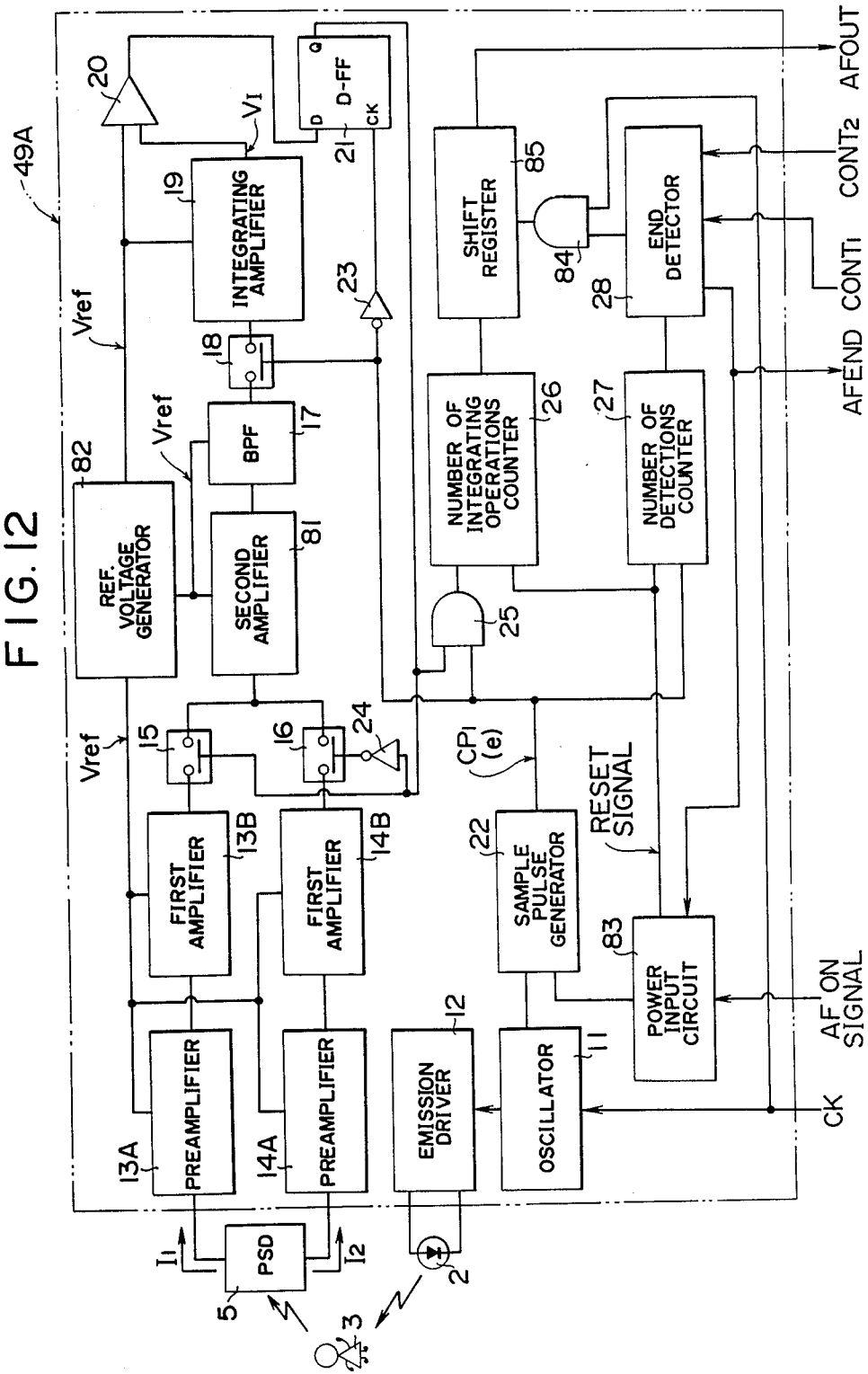
FIG. 12 is a block diagram of AFIC shown in FIG. 11.

FIG. 12 is a block diagram of a specific circuit arrangement of the embodiment of distance measuring apparatus shown in FIG. 9. Specifically, the distance measuring apparatus shown in FIG. 12 is included within AFIC 49A of a full-automatic camera (see FIG. 10). In this arrangement, preamplifiers 13A, 14A, first amplifiers 13B, 14B as well as a second amplifier 81 which is a preceding stage to BPF 17 are employed to amplify output currents $I_1$, $I_2$ from PSD 5. These amplifiers, BPF 17, as well as an integrating amplifier 19 and a comparator 20 are fed with a reference voltage Vref from a reference voltage generation circuit 82. AFIC 49A delivers a signal and receives a signal to and from CPU 32. Fundamental clock CK from CPU 32 is fed to an oscillator 11 and AND gate 84. In response to the receipt of an AF on signal from CPU 32, a power input circuit 83 drives a sample pulse generator 22, and also delivers a reset signal to counters 26 and 27. The counter 27 provides a total number of detections $N_1$ which is determined by an end detection circuit 28 in response to photographing condition signals $CONT_1$, $CONT_2$ which are delivered by CPU 32. When the counter 27 has completed counting the total number of detections $N_l$ thus established, a signal from an AF end detection circuit 28 passes through the gate 84 to feed a shift register 85 in synchronism with the fundamental clock CK. Thereupon, a count in the counter 26 is shifted into the register 85, whereby the register 85 delivers a measurement output AFOUT which depends on the distance l to the object to CPU 32. After the delivery of the output signal AFOUT, the AF end detection circuit 28 feeds an AF end signal AFEND to the power input circuit 83 and CPU 32. In other respects, the circuit arrangement is similar to FIG. 9, and hence will not be described.

Figure 13:
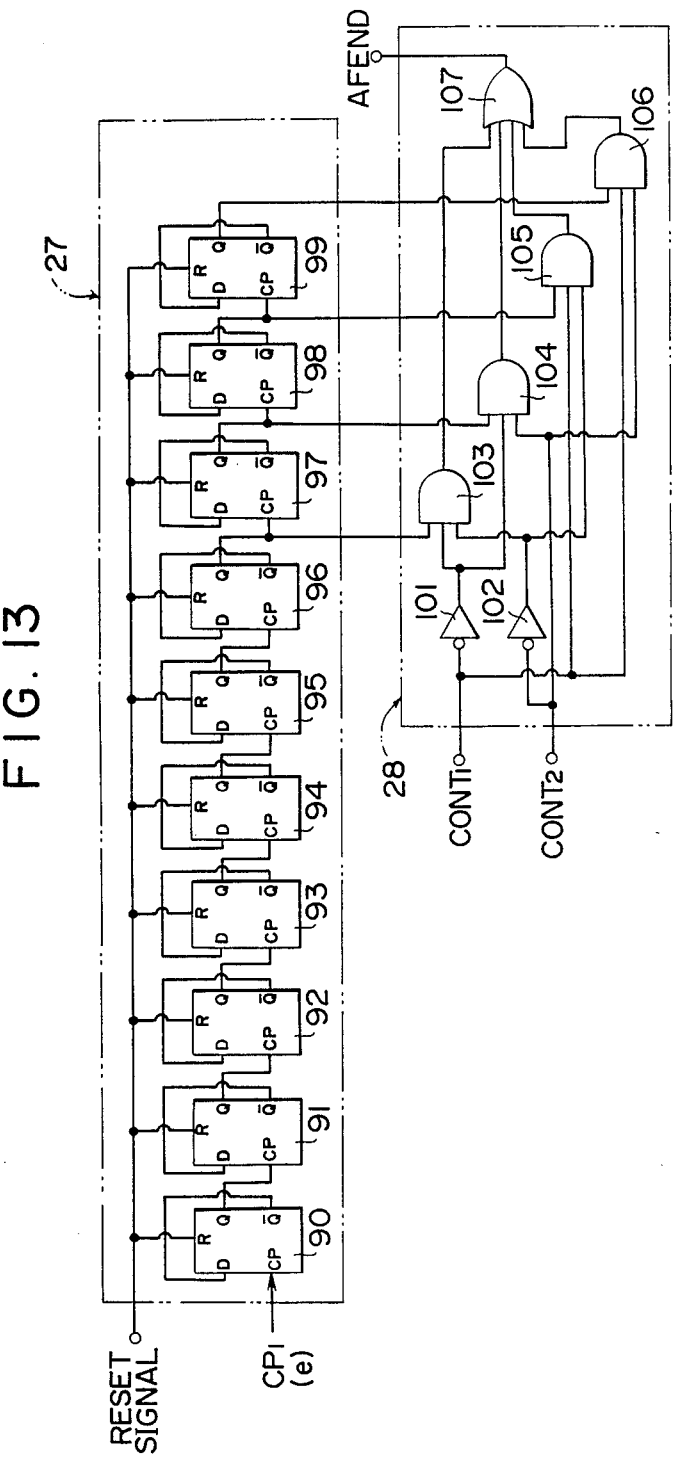
FIG. 13 is a circuit diagram of a specific circuit shown in FIG. 12.

FIG. 13 shows a specific circuit arrangement of the counters 26, 27 and the AF end detection circuit 28 which are contained within AFIC 49A shown in FIG. 12. Specifically, the counter 27, which counts a number of detections $N_0$, comprises ten D-FF's 90 to 99, each of which includes a reset terminal R receiving a reset signal from the power input circuit 83. A sample pulse $CP_1$ (the sample pulse e shown in FIG. 4) from the sample pulse generator 22 is applied to the count input of the counter 27. The AF end detection circuit 28 comprises inverters 101, 102, three-input AND gates 103 to 106 and four input OR gate 107. Each Q output of D-FF's 96 to 99 of the counter 27 is respectively applied to one input of the gates 103 to 106. The gate 107 delivers the AF end signal AFEND.

In the circuit shown in FIG. 13, when the two photographing condition signals $CONT_1$, $CONT_2$ which are supplied to the AF end detection circuit 28 are equal to "0", "0", only the gate 103 is enabled to select an output from D-FF 96, thus delivering the AF end signal AFEND when the number of detections $N_0$ reaches $2^6=64$. When the signals $CONT_1$ and $CONT_2$ are "0", "1", only the gate 104 is enabled to select an output from D-FF 97, thus delivering the AF end signal AFEND when the number of detections $N_0$ reaches $2^7=128$. Similarly, when the signals $CONT_1$, $CONT_2$ are "1", "0", the gate 105 is enabled to select an output from D-FF 98, to deliver the AF end signal AFEND when $N_0=2^8=256$. Finally, when these signals are "1"and "1", the gate 106 is enabled to select an output from D-FF 99, to deliver the AF end signal AFEND when $N_0=2^9=512$. In this manner, with the circuit shown in FIG. 13, the count of sample pulses $CP_1$ which are delivered until the AF end signal AFEND issues can be switched depending on the values of photographing condition signals $CONT_1$ and $CONT_2$, as indicated in Table 2 below.

TABLE 2

| | | $CONT_1$ | |
|---|---|---|---|
| | | 0 | 1 |
| $CONT_2$ | 0 | 64 | 256 |
| | 1 | 128 | 512 |

As mentioned previously, the photographing condition signals CONT$_1$, CONT$_2$ are switched between "0" and "1" depending on the diaphragm aperture F No and the focal length f, and are supplied to AFIC 49A from CPU 32 during the AF sequence.

Figure 14:
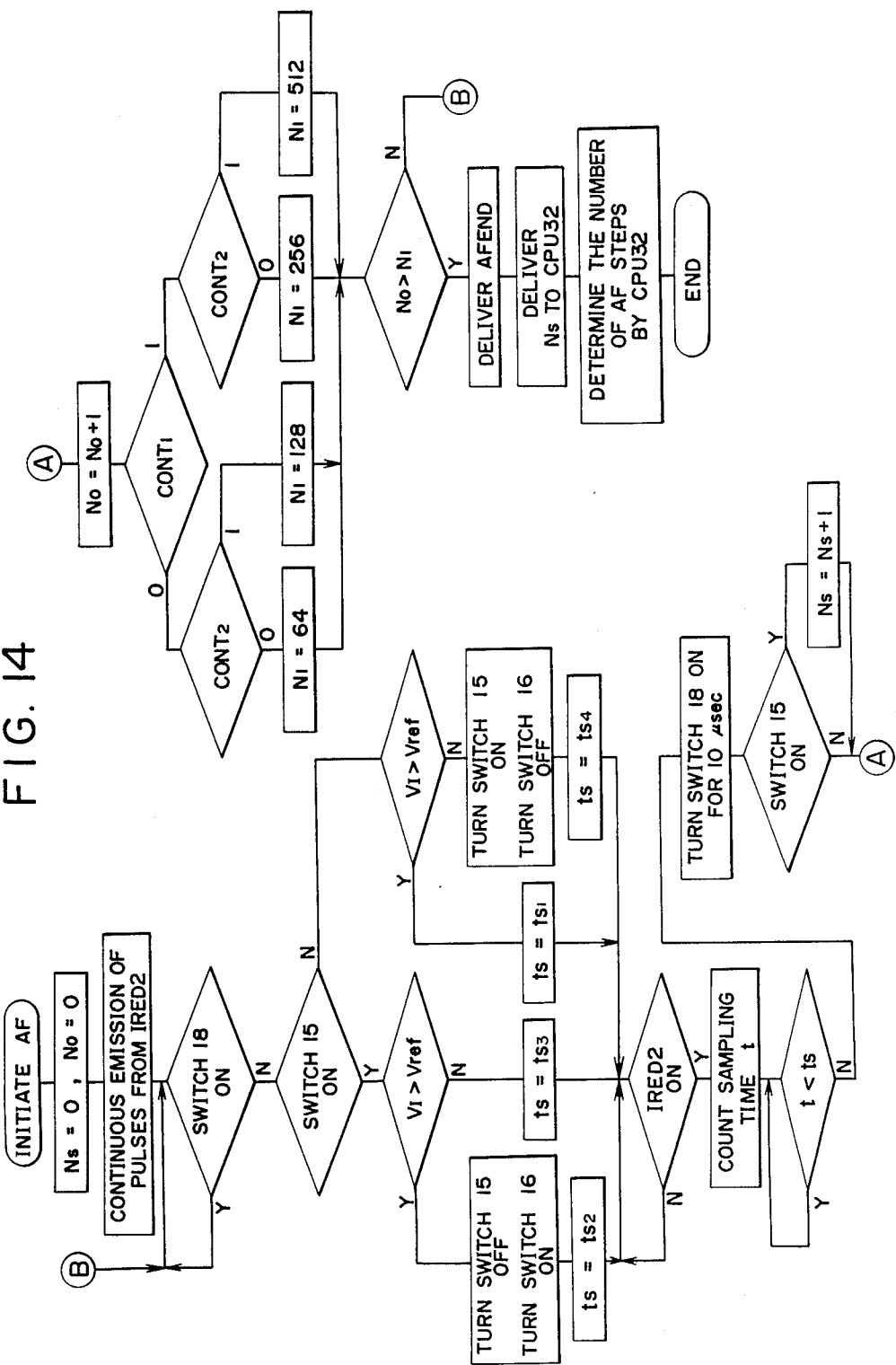
FIG. 14 is a flowchart of an AF sequence appearing in the flowchart shown in FIG. 11.

FIG. 14 is a flowchart representing a programmed operation of the AF sequence which is achieved by the circuit arrangement shown in FIGS. 12 and 13. It will be noted that the operation of this embodiment differs from the flowchart (shown in FIG. 7) of the first embodiment in that the operation of the AF sequence is repeated until a number of detections, which is established in accordance with the photographing condition, is reached. Accordingly, the operation of the AF sequence itself will not be described, but an added portion of the flowchart and supplemental matters will be described below.

Upon initiation of the AF sequence, the fundamental clock CK from CPU 32 is frequency divided by the oscillator 11, and IRED 2 begins to emit pulses continuously at a frequency of 20 kHz and with a duty cycle of 50%. The drive current used is 250 mA. The emission of pulses continues until the AF sequence ends.

Upon initiation of the AF sequence, the counters 26, 27 are reset by a reset signal from the power input circuit 83 (see FIG. 12). If the number of detections N$_0$ does not reach the total number of detections N$_1$, the program returns to a point where the on or off condition of the sample switch 18 is determined. If V$_I$>V$_{ref}$ as a result of an integrating operation, the channel changeover switch 15 is turned off while the switch 16 is turned on, thus changing the direction in which the integrating operation occurs.

The timing t$_s$ when the sample pulse CP$_I$ occurs is similar to the first embodiment. Since one period T is equal to 50 μ sec, when t$_{s1}$=7 μ sec and t$_{s3}$=t$_{s1}$+25 μ sec are employed, $$t_{s2} = t_{s1} + 150 \, \mu \, sec$$

$$t_{s4} = t_{s3} + 150 \, \mu \, sec$$

The width of the sample pulse or the time duration during which the sample switch 18 remains on is equal to 10 μ sec. The described operation is repeated until the total number N$_0$ of the sample pulses CP$_1$ becomes equal to the total number of detections N$_1$. The number of integrating operations N$_S$ which occur in the positive direction is counted by the counter 26. When the number of detections N$_0$ which is counted by the counter 27 becomes equal to the total number of detections N$_1$ which is established in response to the photographing condition signals CONT$_1$, CONT$_2$, the AF end signal is delivered to CPU 32. The shift register 85 then transfers the number of integrating operations N$_S$, which is counted by the counter 26 as serial data, to CPU 32 in synchronism with the fundamental clock CK from CPU 32. Upon completion of the transfer, the AF on signal is turned off, and CPU 32 calculates the distance l to the object in accordance with the equation (6) on the basis of the number of integrating operations N$_S$ which is obtained as a result of the measuring operation, and determines the number of AF steps.

As the total number of detections N$_1$ which is to be counted by the counter 27 is switched to 128, 256 and 512 in accordance with the photographing condition signals CONT$_1$ and CONT$_2$, the number of integrating operations N$_S$ which is counted by the counter 26 changes as indicated in Table 3 below.

TABLE 3

| AF step | N$_1$ | | |
|---|---|---|---|
| | 128 | 258 | 512 |
| 0 (∞) | 64–60 | 128–121 | 256–242 |
| 1 | 59–58 | 120–115 | 241–231 |
| 2 | 57–55 | 114–110 | 230–220 |
| 3 | 54–54 | 109–105 | 219–210 |
| 4 | 52–50 | 104–100 | 209–200 |
| 5 | 49–48 | 99–95 | 199–190 |
| 6 | 47–45 | 94–90 | 189–180 |
| 7 | 44–43 | 85–85 | 179–171 |
| 8 | 42–41 | 84–81 | 170–162 |
| 9 | 40–39 | 80–77 | 161–153 |
| 10 | 38–36 | 76–72 | 152–144 |
| 11 | 35–34 | 71–68 | 143–136 |
| 12 (nearest) | 33–0 | 67–0 | 135–0 |

Thus, CPU 32 determines the number of AF steps depending on the distance l in accordance with the correspondence illustrated in Table 3. In the present embodiment, it is assumed that the baseline has a length of 50 mm, the receiving lens 4 (see FIGS. 1 and 2) has a focal length f=18.3 mm, and PSD 5 has a length t=3 mm. The AF sequence terminates when the focussing lens is moved through the number of AF steps thus determined and then stops.

It will be seen that with the apparatus of the described embodiment, reference is made to either diaphragm aperture or the focal length of the taking lens or both, and a distance measurement output with an enhanced accuracy is obtained when a relatively large diaphragm aperture is used or a lens having an increased focal length is used while a distance measurement output is obtained within a reduced length of time when a reduced diaphragm aperture is used or a lens having a reduced focal length is employed.

Figure 15:
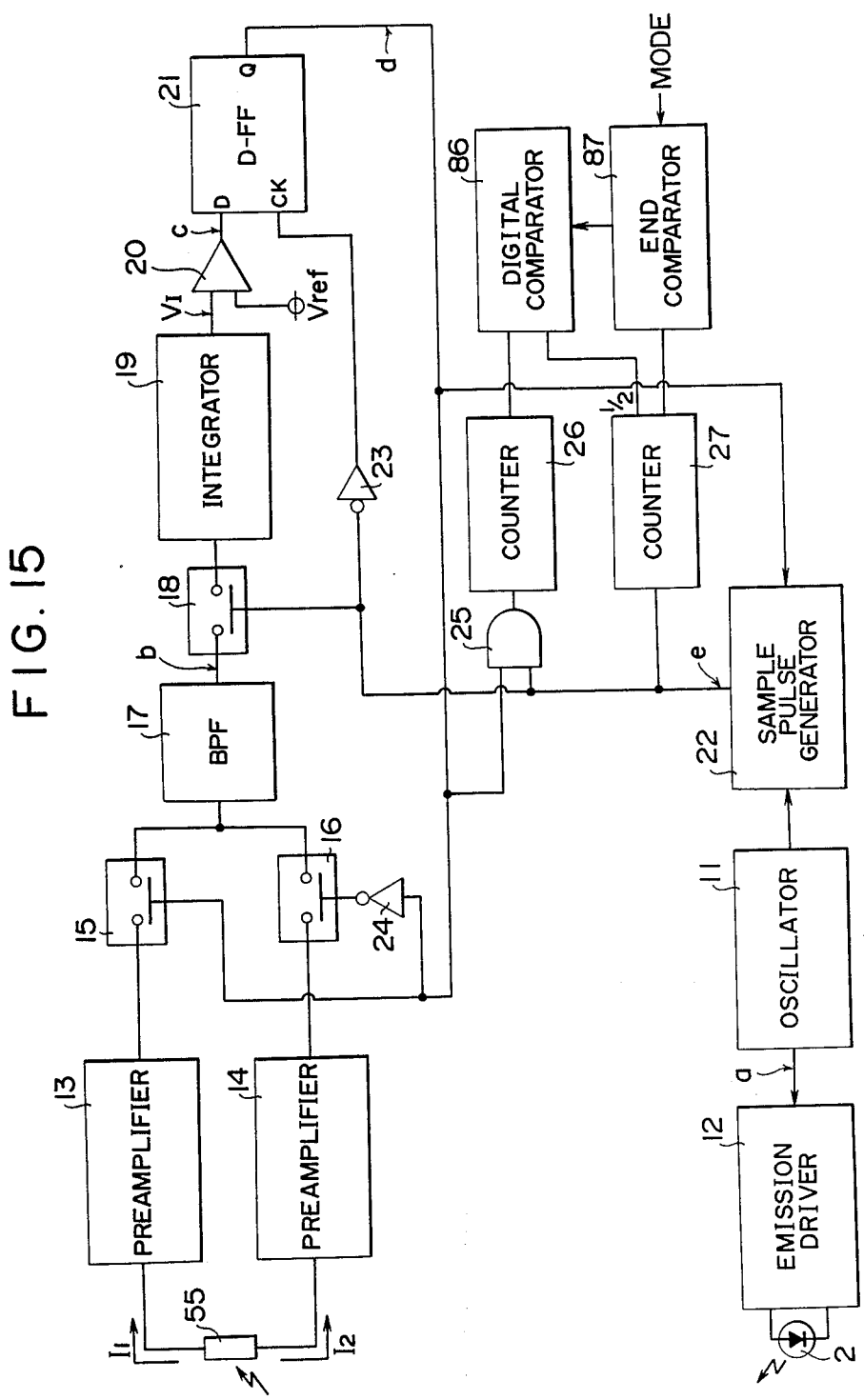
FIG. 15 is a block diagram of a distance measuring apparatus according to a third embodiment of the invention.

FIG. 15 shows a distance measuring apparatus according to a third embodiment of the invention which may be used in a technique employing a position detecting element (PSD) or mechanical interlocked split sensor technique. The latter arrangement will be described first, and is simpler than the PSD technique.

Figure 16:
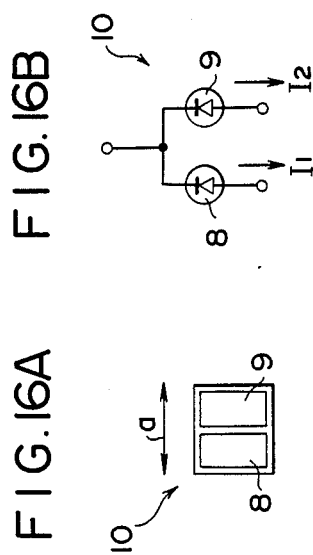
FIGS. 16A and 16B are a plan view and an equivalent circuit diagram of a split sensor used in the apparatus of FIG. 15.

Referring to FIGS. 16A and 16B, photodiodes 8, 9 having an identical photoelectric response are integrally juxtaposed to comprise a split sensor 10, which is mechanically scanned in a direction indicated by an arrow a. The sensor 10 is used in place of PSD 5 shown in FIG. 1, and the direction of scan is chosen to be coincident with x direction. The split sensor 10 is scanned while irradiating the object 3 being photographed with infrared radiation, and when output currents I$_1$ and I$_2$ from the photodiodes 8 and 9 are equal to each other, the infrared radiation impinges upon the center of the sensor 10 where an equal amount of radiation is incident on each of the photodiodes 8, 9 (see FIG. 21A), thus permitting the incident position x to be detected from the scanning. It will be noted that the calculation of the distance l to the object is based on a comparison of the currents I$_1$ and I$_2$ and is common to either PSD technique or the split sensor technique.

As mentioned previously, the third embodiment shown in FIG. 15 is applicable to either PSD or split sensor technique. The arrangement and the operation thereof will now be described. The present arrangement includes an electrical circuit which is constructed in the same manner as the electrical circuit of the first embodiment shown in FIG. 3, except for the fact that a switching between either detector element is enabled. Accordingly, corresponding parts of the third embodiment are designated by like numerals or characters and will not be described specifically. However, it is to be noted that the pulse a developed by the oscillator 11 has a frequency of 20 kHz and a duty cycle of 50% as in the second embodiment.

The detector element 55 is either PSD 5 or split sensor 10. The AF end detection circuit 28 (see FIG. 9) used in the second embodiment is replaced by a combination of a digital comparator 86 and an end comparator 87. The comparator 86 compares a count in the counter 26 against one-half the count in the counter 27. The end comparator 87 receives a mode signal MODE and feeds the comparator 86. The mode signal MODE is used to switch between a PSD mode and a split sensor mode. Specifically, when PSD 5 is used, the distance l is calculated by taking the counts in the counters 26 and 27 in order to derive a digital value for the ratio between the currents $I_1$ and $I_2$ in terms of the ratio of the number of integrating operations in the positive and the negative direction. In this instance, the counter 27 will count up to a relatively high value. When the split sensor 10 is used, a point where the number of integrating operations in the positive direction and the negative direction are related such that a coincidence between the currents $I_1$ and $I_2$ is reached is derived by comparing one-half the output from the counter 27 against the output from the counter 26 in the comparator 86, and the scan position of the split sensor 10 when the outputs coincide is used to calculate the distance l. Since it is only necessary to find the coincidence in this instance, the counter 27 is required to count up to a relatively small value. Because the synchronous integrating operation is performed for each minimal displacement of the scanning of the split sensor 10, it is desirable to reduce the number of detections required per measurement of the distance in order to reduce the time interval which is required for the measurement of the distance.

Either mode may be selected by establishing an "H" or "L" level for the mode signal MODE, and is used in the end comparator 87 to establish the total number of detections $N_1$, which is the number of detections required until a single measurement of the distance is completed, as mentioned previously. When the total number of detections $N_1$ is established, the number of integrating operations $N_S$ in the positive direction will be normalized when PSD 5 is employed, and accordingly, the count in the counter 26 directly represents distance information, without requiring a division to derive a ratio of counts from the counters 26 and 27.

In the mode which employs the split sensor 10, the comparator 86 determines if the content of the counter 26, representing the number of integrating operations $N_S$ in the positive direction, is greater or less than $N_1/2$, thus determining which one of the photodiodes 8 and 9 is receiving more reflected infrared radiation. Obviously, when the radiation impinges upon the center of the split sensor 10, $N_S = N_1/2$.

Thus, the arrangement shown in FIG. 15 is applicable to either a circuit employing PSD 5 or a circuit employing the split sensor 10 as the detector element 55, by merely selecting a mode signal MODE. This means that substantially the entire circuit of the distance measuring apparatus except for the detector element 55 may be constructed in an IC element, enabling either detector technique to be implemented while utilizing a common IC.

It is also to be noted that in the described arrangement, the synchronous integrating operation is combined with the A/D conversion, allowing noise which may have an adverse influence upon the detection of a small current to be cancelled or reduced, thereby improving the signal-to-noise ratio to allow the measurement up to an increased distance with a high accuracy.

Figure 17:
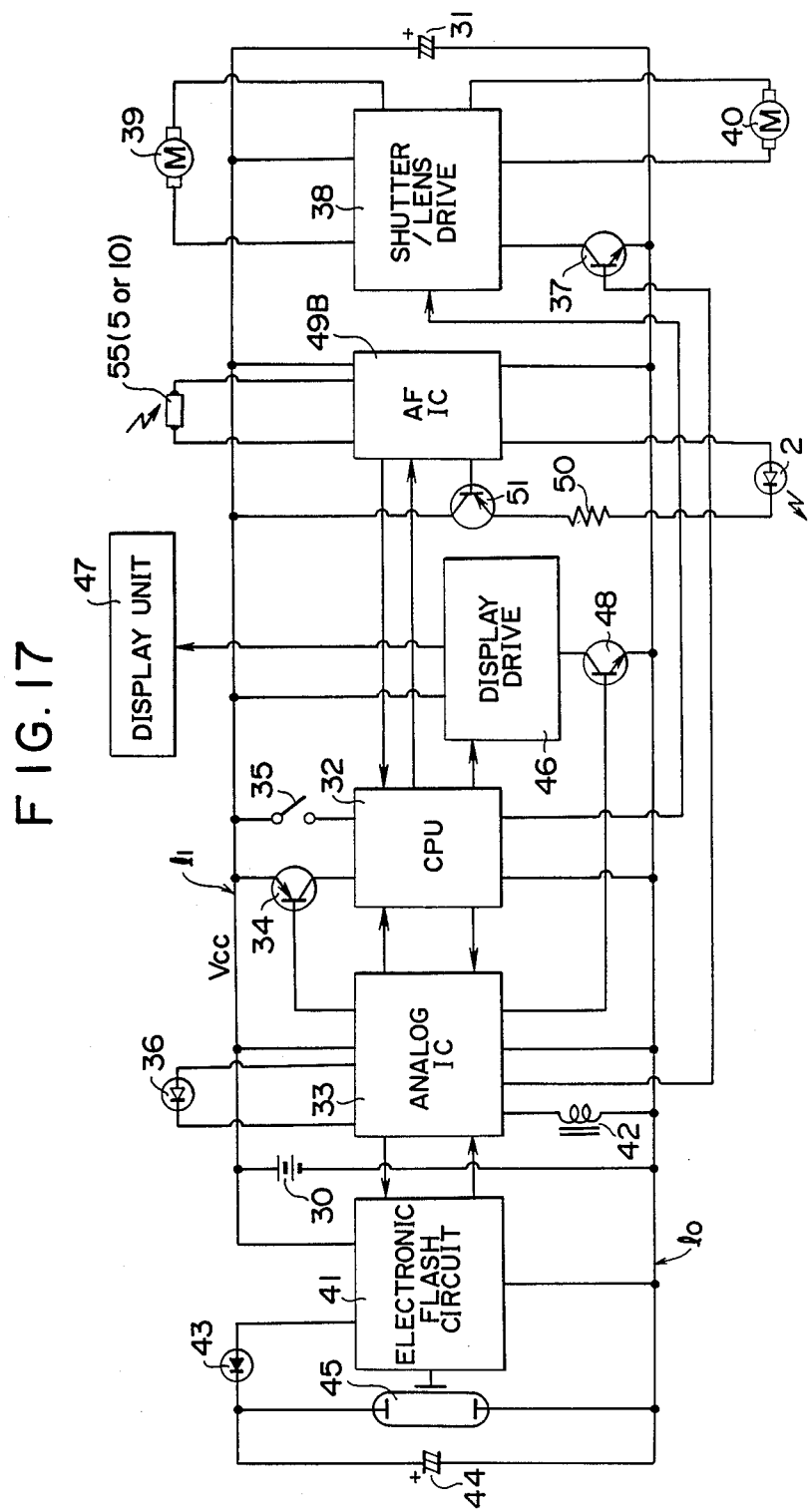
FIG. 17 is a block diagram of a full-automatic camera incorporating the distance measuring apparatus shown in FIG. 15.

FIG. 17 shows a full-automatic camera which incorporates the apparatus according to the third embodiment. Its electrical circuit is substantially similar to the electrical circuit of the full-automatic camera which incorporates the first embodiment (see FIG. 5), but the distance measuring apparatus having the circuit arrangement as shown in FIG. 15 is incorporated into AFIC 49B and the shutter control and lens motor 40 is also used to scan the sensor whenever the split sensor 10 is used as the detector element 55.

Figure 18:
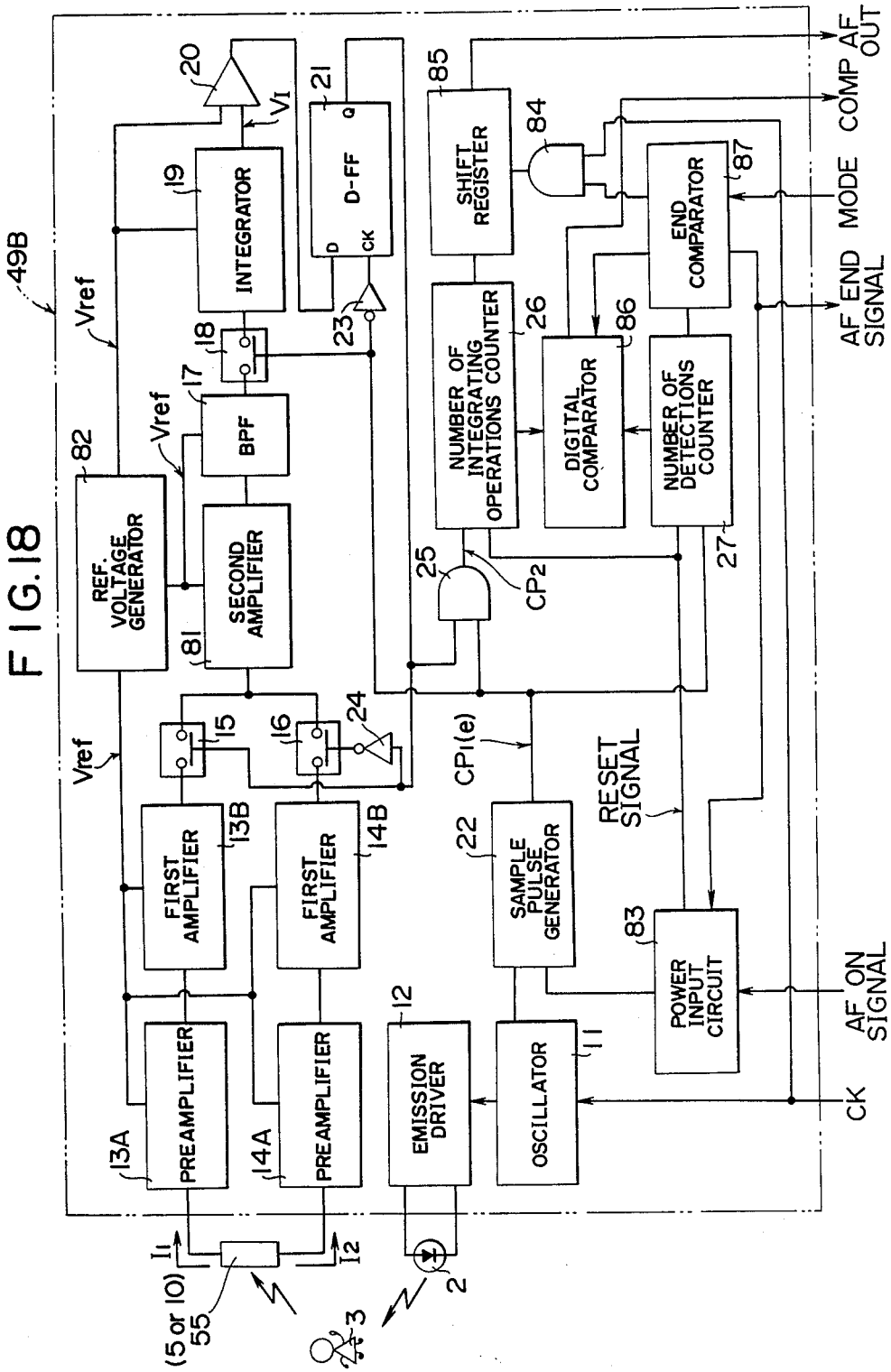
FIG. 18 is a block diagram of AFIC shown in FIG. 17.

FIG. 18 is a block diagram of a specific distance measuring apparatus which is incorporated into AFIC 49B of the full-automatic camera shown in FIG. 17. In the circuit of FIG. 18, the AF end detection circuit 28 used in the second embodiment shown in FIG. 12 is replaced by the combination of the digital comparator 86 and the end comparator 87. To avoid reiteration of description, only those portions which are different from the previous arrangement will be described. The total number of detections $N_1$ which is counted by the counter 27 is established by the end comparator 87 in response to the mode signal MODE which is delivered by CPU 32. When the mode signal MODE is such that PSD 5 is employed as the detector element 55, at the time the counter 27 has counted up to the total number of detections $N_1$, a signal from the end comparator 87 is passed through AND gate 84 to be fed to a shift register 85 in synchronism with the fundamental clock CK to permit a count in the counter 26 to be shifted into the shift register 85. The register 85 delivers a distance measurement output AFOUT, which depends on the distance l, to CPU 32. Alternatively, when the mode signal MODE is such that the split sensor 10 is used as the detector element 55, the end comparator 87 feeds a signal to the digital comparator 86, which delivers an output signal COMP of "H" level, indicating that the scan position of the split sensor 10 has reached a point corresponding to the distance l to the object being photographed, to CPU 32 at the time when the count in the counter 26 coincides with one-half the count in the counter 27. After delivering the output signal AFOUT or COMP, the end comparator 87 delivers the AF end signal to the power input circuit 63 and CPU 32.

Figure 19:
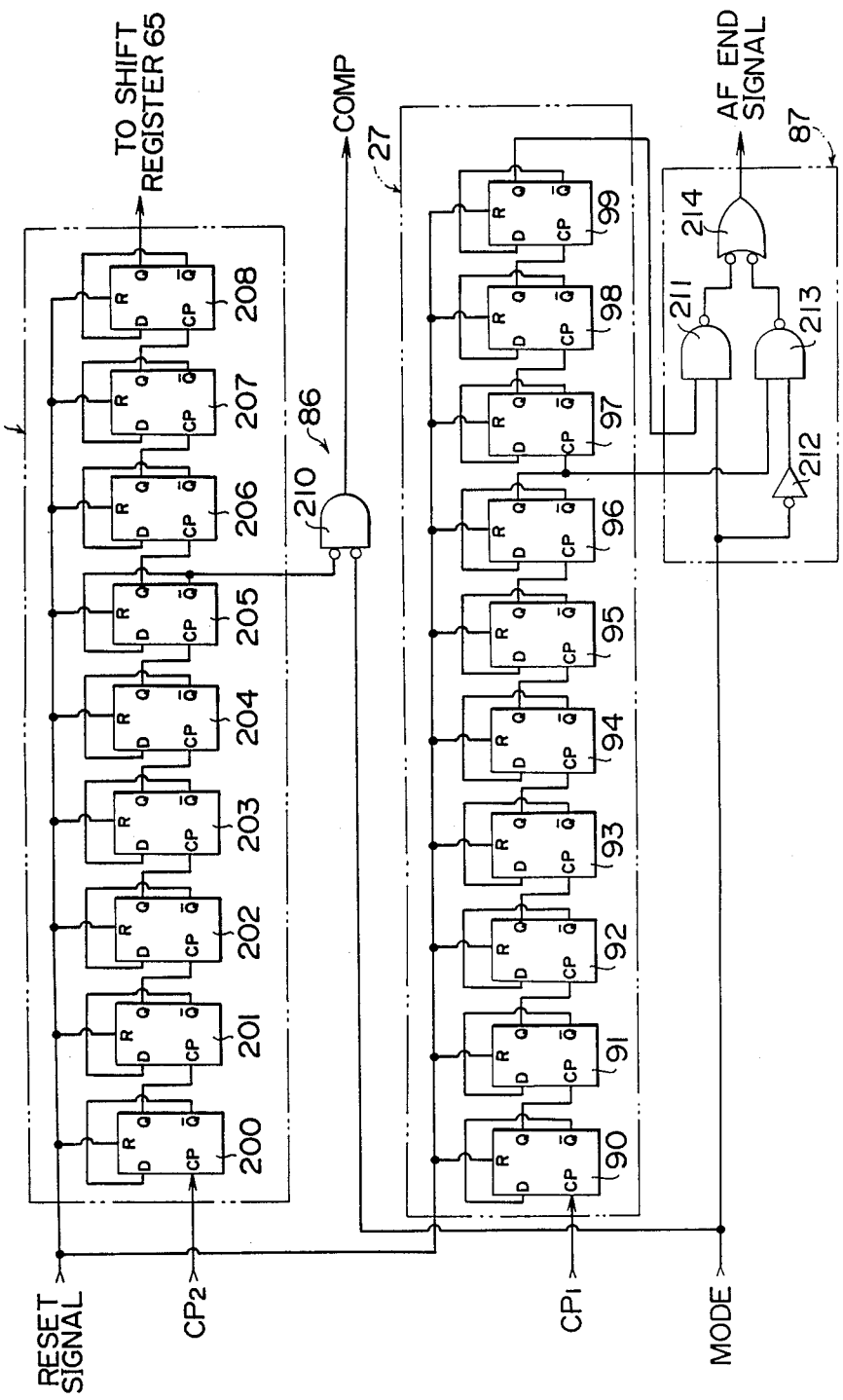
FIG. 19 is a circuit diagram of a specific circuit shown in FIG. 18.

FIG. 19 shows a specific circuit arrangement of the counters 26 and 27, the digital comparator 86 and the end comparator 87 which are contained in AFIC 49B shown in FIG. 18. Referring to FIG. 19, the counter 26 which counts the number of integrating operations $N_S$ comprises nine D-FF's 200 to 208 while the counter 27 which counts the number of detections $N_0$ comprises ten D-FF's 90 to 99 as illustrated previously in FIG. 13. Each D-FF has a reset terminal R, to which a reset signal from the power input circuit 83 is applied. The sample pulse $CP_1$ (or the sample pulse e shown in FIG. 15) from the sample pulse generator 22 is applied to the count input of the counter 27, and the output pulse $CP_2$ from AND gate 25 is applied to the count input of the counter 26. The digital comparator 86 comprises AND gate 210 having low active inputs which respectively receive an inverted output $\overline{Q}$ from D-FF 205 and the mode signal MODE, the gate 210 delivering an output signal COMP. The end comparator 87 comprises NAND gate 211 receiving the output Q from D-FF 99 and the mode signal MODE as inputs, NAND gate 213 respectively receiving the output from D-FF 96 and the mode signal MODE which is inverted by an inverter 212, and OR gate 214 having low active inputs which respectively receive the outputs from the gates 211 and 213, the gate 214 delivering the AF signal.

In the circuit shown in FIG. 19, in a mode in which PSD 5 is used as the detector element 55, the mode signal MODE from CPU 32 assumes its "H" level. Then the end comparator 87 selects an output from D-FF 99 in the counter 27, thus delivering the AF end signal when the number of detections $N_0$ reaches $2^9 = 512$. It will be apparent from the circuit arrangement of the comparator 86 that it does not operate at this time.

Figure 20:
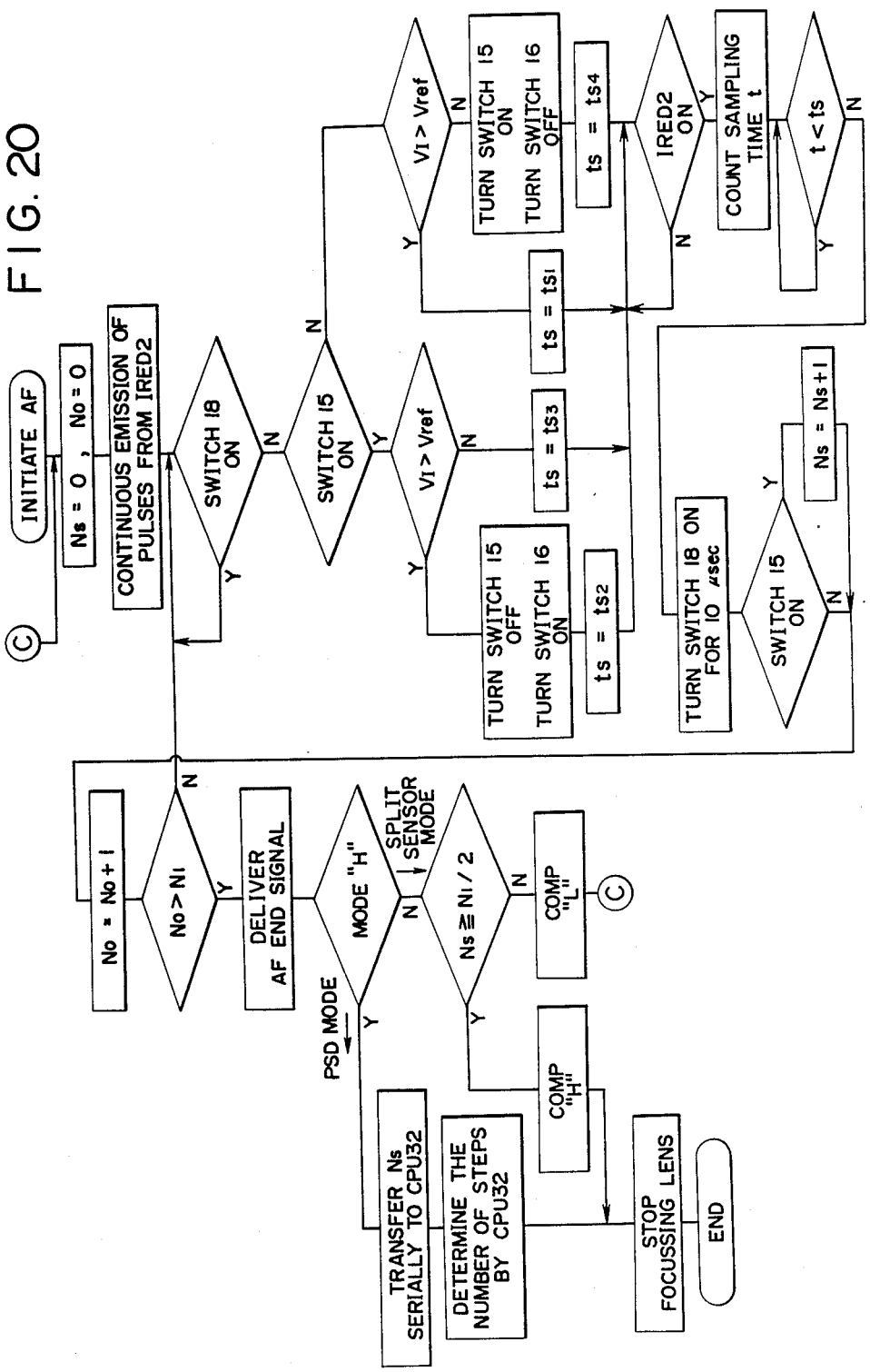
FIG. 20 is a flowchart illustrating an AF sequence of the full-automatic camera shown in FIG. 17.

FIG. 20 is a flowchart illustrating a programmed operation of the AF sequence. In a mode in which PSD 5 is used as the detector element 55, the operation occurs in a manner similar the second embodiment which has been described in connection with the flowchart of FIG. 14 except that the number of detections $N_1$ is fixed to 512 therein.

Figure 21A:
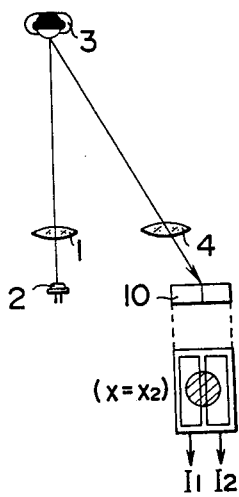

In a mode in which the split sensor 10 is used as the detector element 55, the AF sequence in this mode is substantially similar to the operation in the mode using PSD 5, but there is a difference in a portion of the flowchart subsequent to the delivery of the AF end signal, which difference will now be described. FIG. 21A illustrates that the reflected infrared radiation impinges upon the center of the split sensor 10. It is assumed that a full-automatic camera which incorporates the split sensor 10 adopts a mechanism which moves a focussing lens to be focused to a distance to an object being photographed when the reflected infrared radiation impinges upon the center of the split sensor 10.

Figure 21B:
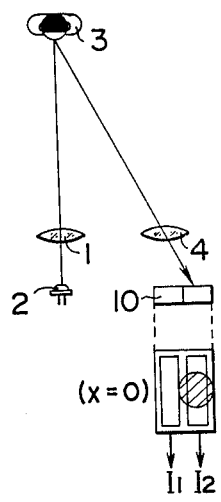

Upon initiation of the AF sequence, the split sensor 10 is reset to its initial position ($x = 0$) as illustrated in FIG. 21B, and scanning begins to occur in a direction indicated by a block arrow incrementally while feeding the focussing lens forwardly. The forward movement of the lens continues until the output signal COMP assumes its "H" level as shown in the timing chart of FIG. 22. The signal COMP of "H" level is delivered when the output currents $I_1$ and $I_2$ from the split sensor 10 assumes a relationship such that $I_1 \geq I_2$. In a manner converse to the mode using PSD 5, in the mode using the split sensor 10, the mode signal MODE supplied from CPU 32 to AFIC 49B is at its "L" level. The end comparator 87 then selects an output from D-FF 96 in the counter 27 shown in FIG. 19, whereby the total number of detections $N_1$ is established to be equal to $2^6 = 64$. At this time, the digital comparator 86 selects an output from D-FF 205 in the counter 26, and hence the signal COMP is delivered at its "H" level when the number of integrating operations $N_S$ is equal to or greater than $2^5 = 32$ and at its "L" level when such number is less than 32. In this manner, it is possible to determine if the number of integrating operations $N_S$ which take place in the positive direction is greater or less than one-half the total number of detections $N_1 = 64$. As in the mode using PSD 5, the number of integrating operations in the positive and the negative direction directly represents the relative magnitudes of $I_1$ and $I_2$.

Figure 21C:
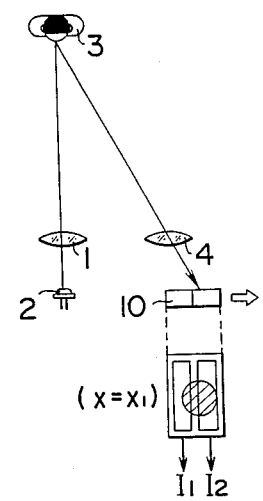
Figure 22:
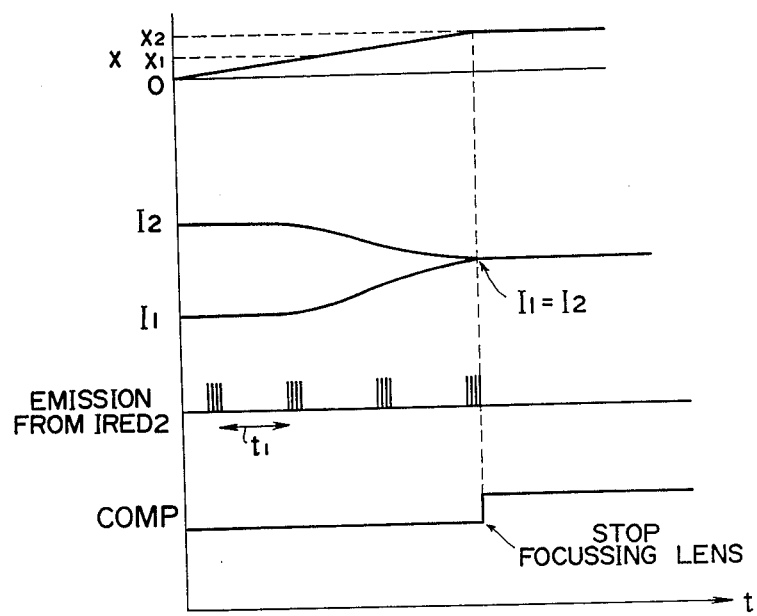
FIG. 22 is a series of timing charts illustrating the waveforms of various signals which occur until an in-focus condition is reached by the operation of the split sensor.

While being driven for the scanning operation, the split sensor 10 performs a synchronous detection of the emission from IRED 2 at a given time interval $t_1$ (100 m sec) until the total number of detections $N_1 = 64$ is reached, as indicated in the timing chart of FIG. 22. The time interval $t_1$ is established by CPU 32, which delivers the AF on signal to AFIC 49B every 100 m sec. FIG. 21C illustrates a condition in which the split sensor 10 has been scanned to a position $x_1$ where there still applies the inequality $I_1 < I_2$ as before. Accordingly, as shown in the flowchart of FIG. 20, $N_S < N_1/2$, whereby the signal COMP assumes its "L" level. This represents a signal which indicates the need to continue the scanning operation to CPU 32, which therefore again delivers the AF on signal after the time interval $t_1$.

When the split sensor 10 reaches a position $x = x_2$, there results $I_1 = I_2$ where the focussing lens has reached its in-focus position. The digital comparator 86 then determines that $N_S \leq N_1/2$, whereby the signal COMP changes to its "H" level, thus sending out a signal to CPU 32 which causes the scanning operation to be terminated and the focussing operation to be brought to a stop. As mentioned previously, a drive source for the scanning of the split sensor 10 and for the movement of the focussing lens comprises the motor 40 (see FIG. 17), which is controlled by CPU 32 through the shutter/lens drive circuit 38. From the foregoing, it will be seen that AFIC 49B described above can be used in common in PSD mode or split sensor mode by merely changing the mode signal depending upon the specification of the camera, and thus can be constructed as a general purpose IC for a distance measuring apparatus.

In the embodiments described above, a digital comparator having a most simple arrangement has been employed. However, by enhancing the functioning of the comparator, it is possible to predict the amount of scanning for the split sensor 10 so that the speed of movement of a focussing lens may be reduced as the in-focus position is approached, thereby achieving a higher accuracy of distance measurement.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A distance measuring apparatus comprising:
   radiation projecting means which is driven to emit pulses of radiation continuously;
   radiation receiving means for providing a pair of electrical signals having a values which depend on incident position thereon of radiation which is reflected from an object being photographed as it is irradiated by the radiation projecting means;
   switch means for switching between the pair of electrical signals to feed a common signal line;
   integrated means for integrating the electrical signals fed to the common signal line in synchronism with the emission of pulses from the radiation projecting means, the integrating means integrating one of the electrical signals in a positive direction and the other one of the electrical signals in a negative direction with respect to a reference signal;
   comparator means for comparing an output from the integrating means against a reference signal;
   control means for operating the switch means in accordance with a decision rendered by the comparator means so that the output from the integrating means shifts toward the reference signal;

first counter means for counting a total number of integrating operations performed by the integrating means;

second counter means for counting a number of integrating operations performed by the integrating means either in the positive or the negative direction;

and means for deriving a value of distance measured based on a count in the second counter means relative to a count in the first counter means.

2. A distance measuring apparatus according to claim 1 in which the radiation receiving means is a PSD semiconductor element formed by a PIN photodiode, the photodiode having a pair of terminals which divide a photocurrent resulting from the incident radiation at a ratio which depends on the position of incidence or radiation thereon.

3. A distance measuring apparatus according to claim 1, further including second switch means connected between the common signal line and the integrating means.

4. A distance measuring apparatus according to claim 3 in which the second switch means is controlled by a sample pulse which is synchronized with the emission of a pulse from the radiation projecting means.

5. A distance measuring apparatus according to claim 4 in which the sample pulse is delivered in synchronism with the peak or valley of the emission for the integrating operation in the positive and the negative direction, respectively.

6. A distance measuring apparatus according to claim 1 in which the control means inhibits operating of the switch means during an integrating operation by the integrating means.

7. A distance measuring apparatus according to claim 1 in which the control means delays the timing of occurrence of the sampling pulse when the switch means is operated.

8. A distance measuring apparatus comprising radiation projecting means driven for emission of pulses of radiation continuously;

radiation receiving means for providing a pair of electrical signals having values which depend upon an incident position thereon of radiation reflected from an object being photographed as it is irradiated by the radiation projecting means;

switch means for switching between the pair of electrical signals to feed a common signal line;

integrating means for integrating the pair of electrical signals fed to the common signal line in synchronism with the emission of pulse from the radiation projecting means, the integrating means integrating one of the electrical signals in a positive direction and the other in a negative direction with respect to a reference signal;

comparator means for comparing an output from the integrating means against a reference signal;

control means for operating the switch means in accordance with a decision rendered by the comparator means so that an output from the integrating means shifts toward the reference signal;

first counter means for counting the number of integrating operations performed by the integrating means;

second counter means for counting the number of counting operations performed by the integrating means either in the positive or the negative direction;

changing means for variably changing a total number of integrating operations which is counted by the first counter means depending on a photographing condition;

and means for deriving a value of distance measured based on a count in the second counter means relative to a count in the first counter means.

9. A distance measuring apparatus according to claim 8 in which the radiation receiving means is a PSD semiconductor element formed by a PIN photodiode, the photodiode having a pair of terminals which divide a photocurrent resulting from the incident radiation at a ratio which depends on the position of incidence thereon.

10. A distance measuring apparatus according to claim 8, further including second switch means connected between the common signal line and the integrating means.

11. A distance measuring apparatus according to claim 10 in which the second switch means is controlled by a sample pulse which is synchronized with the emission of a pulse for the radiation projection means.

12. A distance measuring apparatus according to claim 11 in which the sample pulse is delivered in synchronism with the peak or valley of the emission for the integrating operation in the positive and the negative direction, respectively.

13. A distance measuring apparatus according to claim 8 in which the control means inhibits operation of the switch means during an integrating operation by the integrating means.

14. A distance measuring apparatus according to claim 8 in which the control means delays the timing of occurrence of the sampling pulse when the switch means is operated.

15. A distance measuring apparatus according to claim 8 in which said changing means determines a total number of integrating operations which is suitable for a particular photographing operation taking into consideration at least one of the values including focal length of a taking lens and a diaphragm aperture during a photographing operation.

16. A distance measuring apparatus according to claim 8 in which said changing means responds to a switching operation of a lens changeover switch connected to the CPU of a camera and which is switched in response to a change in the focal length of a taking lens, thereby controlling the total number of integrating operations which properly corresponds to an accuracy of distance measurement determined by CPU.

17. A distance measuring apparatus comprising radiation projecting means which is driven to emit pulses of radiation continuously;

radiation receiving means for providing a pair of electrical signals having values which depend on incident position thereon of radiation which is reflected from an object being photographed as it is irradiated by the radiation projecting means;

switch means for switching between the pair of electrical signals to feed a common signal line;

integrating means for integrating the electrical signals fed to the common signal line in synchronism with the emission of pulses from the radiation projecting means, the integrating means integrating one of the electrical signals in a positive direction and the other in a negative direction with respect to a reference signal;

comparator means for comparing an output from the integrating means against a reference signal;

control means for operating the switch means in accordance with a decision rendered by the comparator means so that the output from the integrating means shifts toward the reference signal;

first counter means for counting the number of integrating operations performed by the integrating means;

second counter means for counting the number of integrating operations performed by the integrating means either in the positive or the negative direction;

second comparator means for comparing one-half the count in the first counter means against a count in the second counter means;

and switch means for switching between an output from the second comparator means or a count in the second counter means relative to a count in the first counter means as an output value for the distance being measured.

18. A distance measuring apparatus according to claim 17 in which the detection means comprises a PSD semiconductor element formed by a PIN photodiode having a pair of terminals which divide a photocurrent resulting from an incident radiation at a ratio depending on an incident position of radiation thereon, the detection means being used when the switch means chooses a count in the second counter relative to a count in the first counter as an output value for the distance measurement.

19. A distance measuring apparatus according to claim 17, in which the detection means comprises a split sensor formed by a pair of photodiodes having an equal photoelectric response and integrally juxtaposed together, the split sensor being mechanically scanned in one direction until photocurrents from the pair of photodiodes are equal to each other, the split sensor being used when the switch means chooses an output from the second comparator means as an output value for the distance measurement.

20. A distance measuring apparatus according to claim 17, further including second switch means connected between the common signal line and the integrating means.

21. A distance measuring apparatus according to claim 20 in which the second switch means is controlled by a sample pulse which is synchronized with the emission of pulse from the radiation projection means.

22. A distance measuring apparatus according to claim 21 in which the sample pulse is delivered in synchronism with the peak or valley of the emission for the integrating operation in the positive and the negative direction, respectively.

23. A distance measuring apparatus according to claim 17 in which the control means inhibits operation of the switch means during the integrating operation performed by the integrating means.

24. A distance measuring apparatus according to claim 17 in which the control means delays the timing of occurrence of the sample pulse during a switching operation of the switch means.

25. A distance measuring apparatus comprising
radiation projecting means for projecting radiation upon an object being photographed;

radiation receiving means for receiving radiation reflected from the object being photographed as it is irradiated by the radiation projecting means to provide a pair of electrical signals having values which depend upon an incident position thereon of the reflected radiation;

switch means for switching between the pair of electrical signals to feed a common signal line;

integrating means for receiving the pair of electrical signals through the switch means for integrating one of the electrical signals in a positive direction and the other in a negative direction;

comparator means for comparing an output from the integrating means against a reference signal;

control means responsive to an output from the comparator means for performing a switching operation of the switch means;

and means for deriving a value of the distance measured based on either a number of integrating operations in the positive or the negative direction or a total number of integrating operations performed by the integrating means.

26. A distance measuring apparatus comprising
radiation projecting means continuously driven for emission of pulses of radiation;

radiation receiving means for providing a pair of electrical signals having values which depend on an incident position thereon of radiation reflected from the object being photographed as it is radiated by the radiation projecting means;

switch means for switching between the pair of electrical signals to feed one of said signals to a common signal line;

sample pulse generator means for generating a sample pulse in synchronism with the emission of the pulse from the radiation projecting means;

integrating means responsive to said common signal line for integrating one of the electrical signals in a positive direction and the other in a negative direction during one time duration of the sample pulse;

comparator means for comparing an output signal from the integrating means against a reference signal;

control means for controlling a switching operation of the switch means on the basis of an output from the comparator means;

counter means for counting the number of integrating operations performed by the integrating means in terms of the number of sample pulses;

and means for deriving a value of the distance measured based on an output from the counter means.

27. A distance measuring apparatus according to claim 26, further comprising second switch means connected between the common signal line and the integrating means.

28. A distance measuring apparatus according to claim 27 in which the second switch means is controlled by the sample pulse which is synchronized with the emission a pulse from the radiation projecting means.

29. A distance measuring apparatus according to claim 28 in which the sample pulse is delivered in synchronism with either the peak or the valley of the emission for the integrating operation in the positive and the negative direction, respectively.

30. A distance measuring apparatus according to claim 26 in which the control means inhibits a switching operation of the switch means during an integrating operation by the integrating means.

31. A distance measuring apparatus according to claim 26 in which the control means delays the timing of occurrence of the sample pulse during the switching operation of the switch means.

32. A method of measuring distance comprising the steps of
receiving radiation reflected from an object being photographed to provide a pair of electrical signals which depend on an incident position of the reflected radiation,
selecting one of the electrical signals,
integrating the selected signal in a positive direction to develop an increasing output value,
comparing the output value against a reference signal,
selecting the other electrical signal whenever the output value exceeds the reference signal, integrating the other electrical signal in a negative direction to decreased said output value,
and deriving a value for a distance to the object being photographed based on one of the following conditions including the number of integrating operations performed in the positive or the negative direction and the total number of integrating operations.

33. A distance measuring apparatus according to claim 1 in which the receiving means is a split sensor formed by a pair of photodiodes having a substantially equal photoelectric response and integrally juxtaposed together, the split sensor being mechanically scanned in one direction until the photocurrents of the photo diodes are substantially equal to each other.

34. Distance measuring apparatus comprising:
means for emitting radiation pulses in a continuously repeating manner;
means for receiving said radiation pulses reflected from an object being photographed for generating a pair of electrical signals each having at least one characteristic which depends on the incident position of said radiation on said receiving means;
means for selectively coupling said electrical signals to a common output line;
means for integrating electrical signals passed by said common output line;
means for comparing the output of said integrating means against a predetermined reference level;
control means for operating said means for selectively coupling said pair of signals to said common output line so that the output form the integrating means is shifted in a direction toward the reference level;
means for accumulating the number of integrations performed by said integrating means;
means for accumulating the number of integrations performed on one of said pair of signals by said integrating means; and
means for deriving a distance value from one of said accumulation means when the other one of said accumulation means reaches a predetermined value.

35. A method for measuring the distance between a radiation generating means generating pulses in a continuously repeating manner and an object reflecting said pulses through the employment of radiation detection means located adjacent to the radiation generating means and capable of generating a pair of signals whose relative values are dependent upon the position of the reflected radiation incident thereon, said method comprising the steps of:
(a) integrating one of said pair of signals as it moves in a first predetermined direction;
(b) integrating the other one of said pair of signals as it moves in a direction opposite said first predetermined direction when the integrated output obtained at step (a) reaches a predetermined threshold;
(c) repeating step (a) when the said other one of said pair of signals reaches said predetermined threshold;
(d) counting the number of integrations performed on each signal of said pair of signals; and
(e) utilizing the accumulated counts to derive a value representing the distance between the object and the receiving means.

36. The method of claim 35 further comprising the steps of summing the number of integrations performed on both signals of said pair of signals and utilizing at least one of the three accumulated counts for deriving the distance value.

37. The method claim 36 wherein the distance value is derived form one of the accumulated counts when another one of the accumulated counts reaches a predetermined value.

38. A distance measuring apparatus comprising:
radiation projecting means which is driven to emit pulses of radiation continuously;
radiation receiving means for providing a pair of electrical signals having values which depend on the incident position thereon of radiation which is reflected from an object being photographed as it is irradiated by the radiation projecting means;
switch means for switching between the pair of electrical signals to selectively feed one of said signals to a common signal line;
integrating means responsive to signals fed to said common signal line for integrating one of the pair of electrical signals in a positive or a negative direction via said switch means;
comparator means for comparing an output from the integrating means against a reference signal;
control means for operating the integrating means under control of the comparator means such that the integrating means integrates one of the electrical signals in a positive direction in a first operating state and integrates the other one of the electrical signals in a negative direction in a second operating state and switches operating states responsive to the output of the comparator means;
counter means for counting the total number of integrating operations and the number of integrating operations in one of the positive and the negative directions; and
means for deriving a distance value based on the counts developed by said counter means.

39. A distance measuring apparatus according to claim 38 in which the positive and the negative integrating operations by said integrating means is obtained by means for shifting the phases of said two electrical signals by 180° relative to one another.

40. A distance measuring apparatus according to claim 38 in which the positive and the negative integrating operations by said integrating means are each repeated a number of times.

41. A distance measuring apparatus comprising:

radiation projecting means which is driven to emit pulses of radiation continuously;

radiation receiving means for providing a pair of electrical signals having values which depend on the incident position thereon of radiation which is reflected from an object being photographed as it is irradiated by the radiation projecting means;

integrating means for selectively receiving one of the pair of electrical signals and integrating one of the electrical signals in a positive or a negative direction;

comparator means for comparing an output from the integrating means against a reference signal;

control means for operating the integrating means responsive to an output from the comparator means such that it integrated one of the electrical signals in a positive direction and the other one of the electrical signals in a negative direction and repeats each of the total integrating operations a given number of times;

counter means for counting the number of integrating operations in one of the positive and negative directions; and means for deriving a distance value based on the total number of integrating operation and the count value developed by said counter means.

42. A distance measuring apparatus according to claim 41 in which the total number of integrating operations is variable in dependence on a photographing condition.

43. A distance measuring apparatus according to claim 41 further including digital comparator means for comparing the count value with half of the number of the total integrating operations.

44. A distance measuring apparatus according to claim 43 further including switch means for selecting an output from the distance deriving means according to the type of radiation receiving means employed in said apparatus.

45. A distance measuring apparatus according to claim 43 further including switch means for selecting an output from the digital comparator means according to the type of radiation receiving means employed in said apparatus.

46. A distance measuring apparatus according to claim 43 further including switch means for selecting an output from the distance measuring means according to the type of radiation means employed in said apparatus.

47. An apparatus for measuring a focus condition of a camera, comprising;
a picture taking lens;
radiation projecting means which is driven to emit pulses of radiation continuously;
radiation receiving means composed of a two division photosensitive element whose radiation receiving position is moved in cooperation with a focusing operation of the taking lens for outputting a pair of electrical signals corresponding to incident positions of reflected light from the radiation projecting means on said photosensitive element;
integrating means for receiving one of the electrical signals and integrating said one of the electrical signals in a positive or a negative direction;
comparator means for comparing an output from the integrating means against a reference signal;
control means responsive an output from the comparator means for operating the integrating means such that it integrates one of the electrical signals in a positive direction and the other one of the electrical signals in a negative direction and repeats the total number of integrating operations a given number of times;
counter means for counting the number of positive or negative integrations; and
means for deriving a focus state by comparing a half of the total number of integrating operations with the count value.

48. A distance measuring means apparatus according to claim 8 wherein said changing means further comprises means for terminating the distance measuring operation responsive to a predetermined count being developed said first counter means.

49. A distance measuring apparatus according to claim 48 wherein said changing means changes the count as a function of the focal length of a lens being used to photograph the object whose distance is being measured.

50. A distance measuring apparatus according to claim 48 wherein said changing means changes the count as a function of the lens aperture of a lens being used to photograph the object whose distance is being measured.

51. A distance measuring apparatus according to claim 48 wherein said changing means changes the count as a function of the focal length and lens aperture of a lens being used to photograph the object whose distance is being measured.

52. A distance measuring apparatus comprising:
radiation projecting means which is driven to emit pulses of radiation continuously;
radiation receiving means for providing a pair of electrical signals having a values which depend on the incident position thereon of radiation which is reflected from an object being photographed as it is irradiated by the radiation projecting means;
integrating means for selectively receiving one of the pair of electrical signals and integrating one of the electrical signals in a positive or a negative direction;
comparator means for comparing an output from the integrating means against a reference signal;
control means for operating the integrating means responsive to an output from the comparator means such that it integrates one of the electrical signals in a positive direction and the other one of the electrical signals in a negative direction and repeats each of the total integrating operations a given number of times;
counter means for counting the number of integrating operations in one of the positive and negative directions;
means for deriving a distance value based on the total number of integrating operations and the count value developed by said counter means;
means for terminating the measurement operation when the count in one of said counter means reaches a predetermined count;
changing means for changing the predetermined count activating said terminating means; and
said changing means including switch means for changing said predetermined count according to the type of radiation means employed in said apparatus.

53. A distance measuring apparatus according to claim 52 wherein said predetermined count is reduced when said radiation receiving means is a split sensor.

54. A distance measuring apparatus according to claim 52 wherein said predetermined count is increased when the radiation receiving means is position sensing detector.

* * * * *

UNITED STATES PATENT AND TRADEMARK OFFICE
CERTIFICATE OF CORRECTION

PATENT NO. : 4,855,585　　　　　　　　　　　　　　　　Page 1 of 2

DATED : August 8, 1989

INVENTOR(S) : Osamu Nonaka

It is certified that error appears in the above-identified patent and that said Letters Patent is hereby corrected as shown below:

Column 4, line 3, "22B" should be --21B--

Column 5, line 57, "pulse e" should be --pulse a--

Column 6, line 2, after "19" delete "20"

Column 7, line 39, after "charge" delete "20"

Column 9, line 56, "$t_s$" should be --$t_{s1}$--

Column 20, line 52, after "having" delete "a"

Column 20, line 58, "integrated" should be --integrating--

Column 21, line 18, "or" should be --of--

Column 21, line 34, "operating" should be --operation--

UNITED STATES PATENT AND TRADEMARK OFFICE
CERTIFICATE OF CORRECTION

PATENT NO. : 4,855,585

DATED : August 8, 1989

INVENTOR(S) : Osamu Nonaka

It is certified that error appears in the above-identified patent and that said Letters Patent is hereby corrected as shown below:

Column 22, line 43, after "including" insert --the--

Column 25, line 50, "form" should be --from--

Column 27, line 15, "integrated" should be --integrates--

Column 27, line 24, "operation" should be --operations--

Column 28, line 66, after "is" insert --a--

Signed and Sealed this

Fifteenth Day of October, 1991

Attest:

HARRY F. MANBECK, JR.

*Attesting Officer*     *Commissioner of Patents and Trademarks*